United States Patent [19]

Seitz et al.

[11] Patent Number: 4,631,065
[45] Date of Patent: Dec. 23, 1986

[54] REACTIVE DYES, PROCESS FOR THEIR PREPARATION AND USE THEREOF

[75] Inventors: Karl Seitz, Oberwil; Peter Scheibli, Bottmingen; Herbert Seiler, Riehen, all of Switzerland

[73] Assignee: Ciba-Geigy Corporation, Ardsley, N.Y.

[21] Appl. No.: 767,246

[22] Filed: Aug. 20, 1985

Related U.S. Application Data

[63] Continuation of Ser. No. 618,153, Jun. 7, 1984, abandoned.

[30] Foreign Application Priority Data

Jun. 17, 1983 [CH] Switzerland ............... 3329/83

[51] Int. Cl.$^4$ ............... C09B 62/02; D06P 3/66
[52] U.S. Cl. ............... 8/549; 8/681; 8/682; 8/687; 8/688; 8/689; 8/696; 8/918; 534/632; 534/634; 534/638; 534/731; 534/751; 534/797
[58] Field of Search ............... 8/549; 534/632, 634, 534/638, 797

[56] References Cited

U.S. PATENT DOCUMENTS 3,663,526  5/1972  Oesterlein et al. ............... 8/681
4,330,469  5/1982  Gati et al. ............... 260/242.2

FOREIGN PATENT DOCUMENTS 2817697  10/1979  Fed. Rep. of Germany .
53-117024 10/1978  Japan .
1220823   1/1971  United Kingdom .
1542773   3/1979  United Kingdom .
2015017   6/1979  United Kingdom .
1554080  10/1979  United Kingdom .
1583387   1/1981  United Kingdom .

Primary Examiner—A. Lionel Clingman
Attorney, Agent, or Firm—Edward McC. Roberts; Meredith C. Findlay

[57] ABSTRACT

The invention relates to reactive dyes of the formula

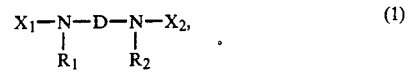

wherein D is the radical of a dye of the monoazo or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, each of $R_1$ and $R_2$ independently is hydrogen or an unsubstituted or substituted $C_1$–$C_4$alkyl radical, $X_1$ is an unsubstituted or substituted aminofluoro-s-triazine radical, and $X_2$ is a heterocyclic reactive radical which is attached direct to the radical D through the —N($R_2$) bridge member, excepting an unsubstituted or substituted aminofluoro-s-triazine.

These dyes are particularly suitable for dyeing and printing cellulosic fibre material by the cold pad-batch method and give dyeings and prints of good fastness properties and high tinctorial strength.

13 Claims, No Drawings

REACTIVE DYES, PROCESS FOR THEIR PREPARATION AND USE THEREOF

This application is a continuation of application Ser. No. 618,153, filed June 7, 1984 now abandoned.

The present invention relates to novel reactive dyes, to the preparation thereof and to the use thereof for dyeing or printing fibre materials.

The practice of dyeing with reactive dyes has given rise in recent times to more stringent requirements being made of he quality of the dyeings and to the economy of the dyeing process. For this reason there is still a need for novel reactive dyes with improved properties, especially application properties.

For dyeing cotton by the cold pad-batch process at the present time it is necessary to use reactive dyes which have a sufficient substantivity which is adapted to the low dyeing temperature and which at the same time have the property of being easily washed off to remove non-fixed dye. The dyes shall also have high reactivity, so that only short batching times are necessary, and they shall also give dyeings with high degrees of fixation. These requirements are only insufficiently fulfilled by known dyes.

Accordingly, the present invention has for its object to provide novel improved reactive dyes for the cold pad-batch process which have the above specified qualities to a high degree. The novel dyes are distinguished in particular by excellent fixation yields and excellent dye-fibre bond stability, and further they have the property of being easily washed off to remove non-fixed dye. They produce dyeings with good general fastness properties, for example lightfastness and wetfastness.

It has been found that this object is accomplished with the novel bireactive dyes defined below. Specifically, the invention relates to reactive dyes of the formula

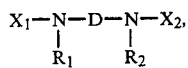  (1)

wherein D is the radical of a dye of the monoazo or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, each of $R_1$ and $R_2$ independently is hydrogen or an unsubstituted or substituted $C_1$–$C_4$ alkyl radical, $X_1$ is an unsubstituted or substituted aminofluoro-s-triazine radical, and $X_2$ is a heterocyclic reactive radical which is attached direct to the radical D through the —N($R_2$) bridge member, excepting an unsubstituted or substituted aminofluoro-s-triazine radical.

The radical D in formula (1) can be substituted in the customary manner. Representative examples of further substituents at the radical D are: $C_1$–$C_4$ alkyl groups such as methyl, ethyl, propyl, isopropyl or butyl; $C_1$–$C_4$ alkoxy groups such as methoxy, ethoxy, propoxy, isopropoxy or butoxy; $C_1$–$C_8$ acylamino groups such as acetylamino, propionylamino or benzoylamino; amino; $C_1$–$C_4$ alkylamino such as methylamino, ethylamino, propylamino, isopropylamino or butylamino; phenylamino, N,N-di-β-hydroxyethylamino, N,N-di-β-sulfatoethylamino, sulfobenzylamino, N,N-disulfobenzylamino; $C_1$–$C_4$-alkoxycarbonyl such as methoxycarbonyl or ethoxycarbonyl; $C_1$–$C_4$alkylsulfonyl such as methylsulfonyl or ethylsulfonyl; trifluoromethyl, nitro, cyano, halogen such as fluorine, chlorine or bromine; carbamoyl, N-$C_1$–$C_4$alkylcarbamoyl such as N-methylcarbamoyl or N-ethylcarbamoyl; sulfamoyl, N-$C_1$–$C_4$alkylsulfamoyl such as N-methylsulfamoyl, N-ethylsulfamoyl, N-propylsulfamoyl. N-isopropylsulfamoyl or N-butylsulfamoyl, N-(β-hydroxyethyl)sulfamoyl, N,N-di-(β-hydroxyethyl)sulfamoyl, N-phenylsulfamoyl; ureido, hydroxy, carboxyl, sulfomethyl or sulfo. The radical D preferably contains one or more sulfonic acid groups. Substituents of reactive dyes of the formula (1), wherein D is the radical of an azo dye, are preferably methyl, ethyl, methoxy, ethoxy, acetylamino, benzoylamino, amino, chlorine, bromine, ureido, hydroxy, carboxy, sulfomethyl or sulfo. Alkyl radicals $R_1$ and $R_2$ are straight chain or branched. They can be further substituted, e.g. by halogen, hydroxy, cyano, $C_1$–$C_4$alkoxy, carboxy or sulfo. Typical examples of $R_1$ and $R_2$ are: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably each of $R_1$ and $R_2$ independently is hydrogen, methyl or ethyl.

Suitable unsubstituted or substituted amino groups in the fluro-1,3,5-trianzinyl radicals $X_1$ are: —$NH_2$, alkylamino, N,N-dialkylamino, cycloalkylamino, N,N-dicycloalkylamino, aralkylamino and arylamino groups, mixed substituted amino groups such as N-alkyl-N-cyclohexylamino and N-alkyl-N-arylamino groups, and also amino groups which contain heterocyclic radicals which may contain further fused carbocyclic rings, and amino groups in which the amino-nitrogen atom is a member of an N-heterocyclic ring which may contain further hetero atoms. The alkyl radicals mentioned above may be straight chain or branched, low molecular or higher molecular. $C_1$–$C_6$Alkyl radicals are preferred. Suitable cycloalkyl, aralkyl and aryl radicals are in particular cyclohexyl, benzyl, phenethyl, phenyl and naphthyl radicals. Heterocyclic radicals are in particular furan, thiophene, pyrazole, pyridine, pyrimidine, quinoline, benzimidazole, benzthiazole and benzoxazole radicals. Suitable amino groups in which the amino-nitrogen atom is a member of an N-heterocyclic ring are preferably radicals of 6-membered N-heterocyclic compounds which may contain nitrogen, oxygen and sulfur as further hetero atoms. The above mentioned alkyl, cycloalkyl, aralkyl and aryl radicals, the heterocyclic radicals and the N-heterocyclic rings may be further substituted, for example by halogen such as fluorine, chlorine and bromine; by nitro, cyano, trifluoromethyl, sulfamoyl, carbamoyl, $C_1$–$C_4$alkyl, $C_1$–$C_4$alkoxy, acylamino groups such as acetylamino or benzoylamino; ureido, hydroxy, carboxy, sulfomethyl or sulfo.

Suitable examples of such amino groups are: —NH₂, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2-carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 1-sulfonaphth-2-ylamino, 1,5-disulfonaphth-2-ylamino, 6-sulfonaphth-2-ylamino, morpholino, piperidino and piperazino.

The heterocyclic reactive radical X is a 4-, 5- or 6-membered heterocyclic radical which is substituted by a removable atom or a removable group. $X_2$ is preferably a halotriazine or halopyrimidine radical. Excepted is an unsubstituted or substituted aminofluoro-s-triazine radical defined as for $X_1$. The heterocyclic radical reactive radical $X_2$ is attached direct to the bridge member —N(R₂)—, i.e. without a further connecting member.

Preferred reactive dyes of the formula (1) are those wherein D is the radical of a monoazo or disazo dye or of a metal complex azo dye. In this case, the radicals —N(R₁)—X₁ and —N(R₂)—X₂ are attached to different or identical radicals of starting components, i.e. diazo and coupling components. The radicals —N(R₁)—X₁ and —N(R₂)—X₂ are preferably attached to one component, either diazo component or coupling component. The reactive dyes then have e.g. the formula

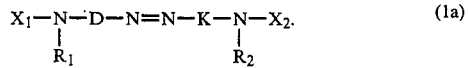
(1a)

If both radicals —N(R₁)—X₁ and —N(R₂)—X₂ are attached to the same radical of a starting component D or K, said radical is in particular the radical of the coupling component K. The reactive dyes then have the formula

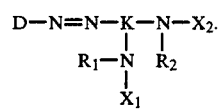
(1b)

Further possible reactive dyes are those of the formula (1a), wherein the radical D or K contains an additional reactive radical, and reactive dyes of the formula (1b), wherein the radical D contains an additional reactive radical. Accordingly, tri-reactive and tetra-reactive dyes are also comprised. The additional reactive radicals contained in D or K can be attached, like $X_1$ and $X_2$, through amino groups or in another way, e.g. through a direct bond, to D or K. What has been stated above also applies by analogy to disazo dyes and metal complex azo dyes.

Preferred reactive dyes are those of the formula

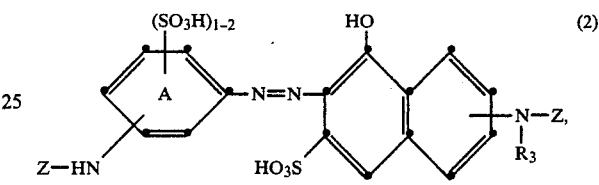
(2)

wherein both radicals Z are alternatively $X_1$ or $X_2$, and $X_1$ and $X_2$ are as defined for formula (1), $R_3$ is hydrogen, methyl or ethyl, and the benzene ring A may contain further substituents.

Also preferred are reactive dyes of the formula

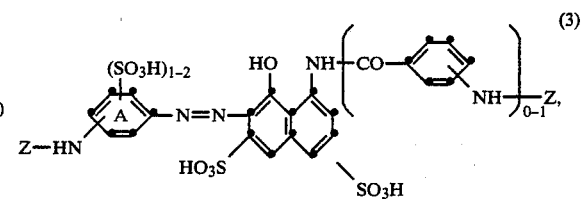
(3)

wherein both radicals Z are alternatively $X_1$ or $X_2$, and $X_1$ and $X_2$ are as defined for formula (1), and the benzene ring A may contain further substituents.

Particularly preferred reactive dyes are those of the formula (2), wherein the benzene ring A is not further substituted, and those of the formula (3), wherein the benzene ring A is not further substituted.

Also preferred are reactive dyes of the formula

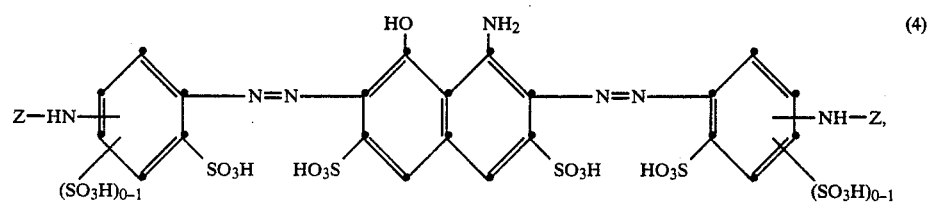
(4)

wherein both radicals Z are alternatively $X_1$ or $X_2$, and $X_1$ and $X_2$ are as defined for formula (1).

A further preferred embodiment of the invention comprises reactive dyes of the formula (1) and of the other formulae described above, wherein $X_1$ is an unsubstituted or substituted aminofluoro-s-triazine radical, and $X_2$ is an unsubstituted or substituted amino- or alkoxychloro-s-triazine radical, or a halopyrimidine or halopyridazine radical.

Particularly preferred reactive dyes are those wherein $X_1$ is a radical of the formula

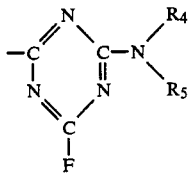  (I)

wherein each of $R_4$ and $R_5$ independently is hydrogen, $C_1$–$C_4$alkyl which is unsubstituted or substituted by halogen, cyano, $C_1$–$C_4$alkoxy, hydroxy, carboxy, sulfo or sulfato, benzyl, phenethyl, cyclohexyl, phenyl or phenyl which is substituted by halogen, nitro, cyano, trifluoromethyl, sulfamoyl, carbamoyl, $C_1$–$C_4$alkyl, $C_1$–$C_4$alkoxy, $C_1$–$C_4$alkanoylamino, benzoylamino, ureido, hydroxy, carboxy, sulfomethyl or sulfo, or naphthyl or naphthyl which is substituted by halogen, nitro $C_1$–$C_4$alkoxy, $C_1$–$C_4$alkanoylamino, hydroxy, carboxy or sulfo, or wherein $R_4$ and $R_5$ together with the amino nitrogen atom form a morpholino, piperidino, or piperazino radical, and $X_2$ is a radical of the formula

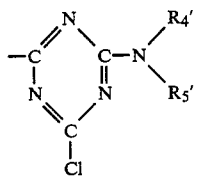  (II)

wherein $R'_4$ and $R'_5$ each independently have the same meanings as $R_4$ and $R_5$ respectively, or a radical of the formula

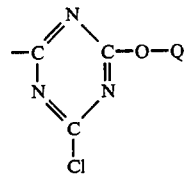  (III)

wherein Q is a $C_1$–$C_4$alkyl radical which can be substituted by halogen, hydroxy, $C_1$–$C_4$alkoxy, cyano, $C_1$–$C_4$alkoxy-$C_1$–$C_4$alkoxy, $C_1$–$C_4$alkoxycarbonyl, carboxy, sulfo, sulfato, sulfamoyl, carbamoyl, cyclohexyl or phenyl, or is a radical of the formula

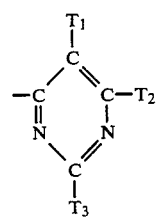  (IV)

wherein $T_1$ is hydrogen, chlorine, fluorine, cyano, nitro, methylsulfonyl or methylsulfinyl, $T_2$ is hydrogen, methyl, chlorine, fluorine, methylsulfonyl, $NH_2$ or an alkylamino, cycloalkylamino, aralkylamino or arylamino radical, and $T_3$ is hydrogen, chlorine, fluroine, methylsulfonyl or methyl, with the proviso that at least one of the radicals $T_1$, $T_2$ and $T_3$ is chlorine or fluorine.

In addition to the above described reactive dyes of the formulae (2), (3) and (4), the reactive dyes of the following formulae may also be mentioned as further useful representatives:

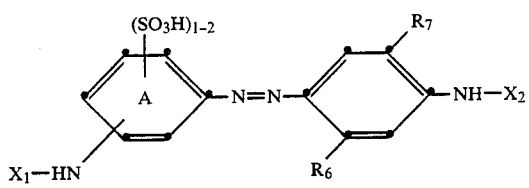  (5)

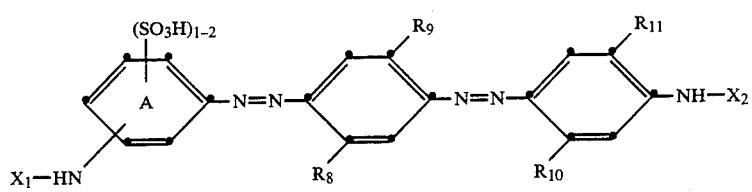  (6)

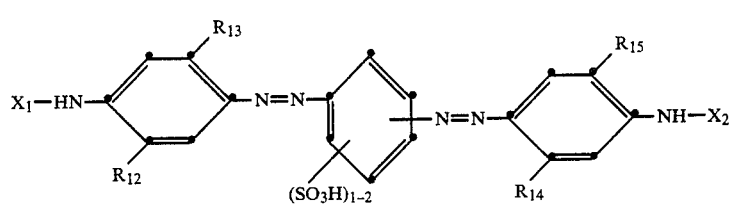  (7)

-continued
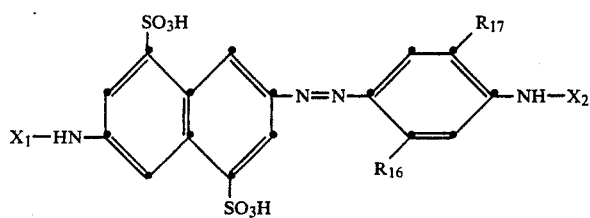 (8)
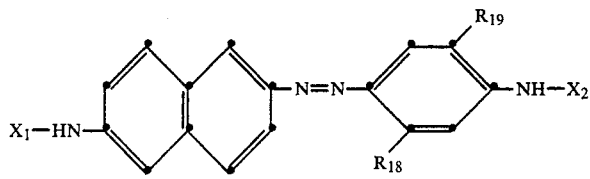 (9)
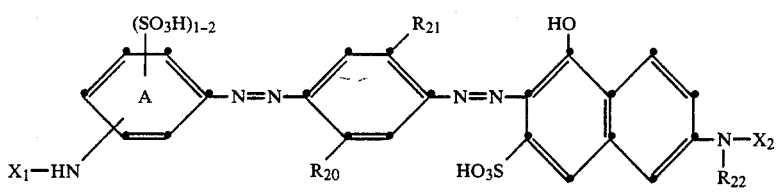 (10)
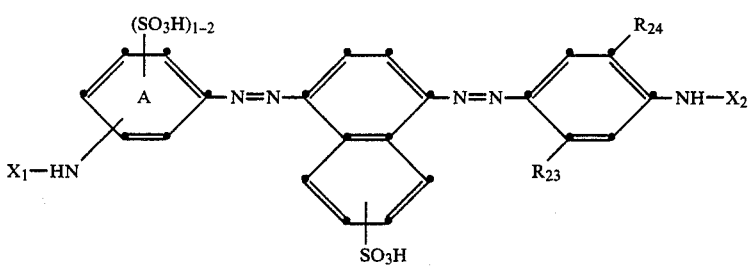 (11)
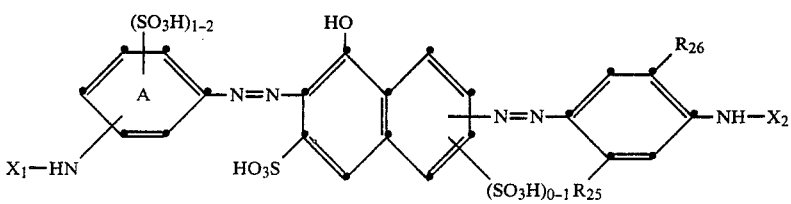 (12)
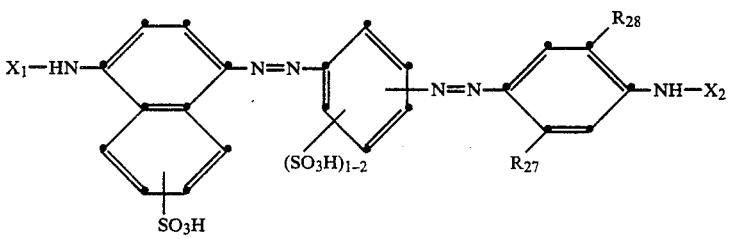 (13)
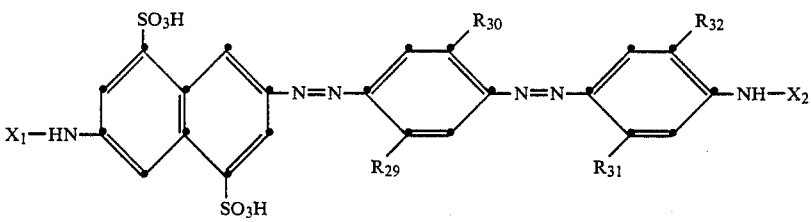 (14)

-continued
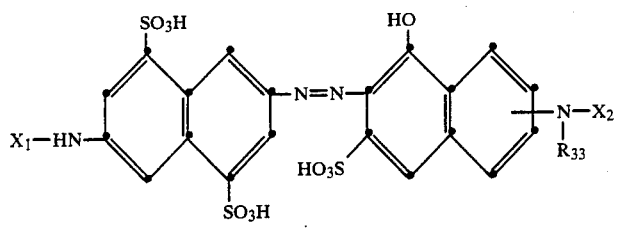
(15)
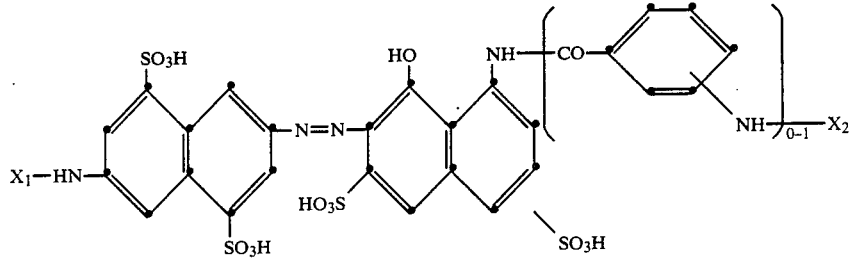
(16)
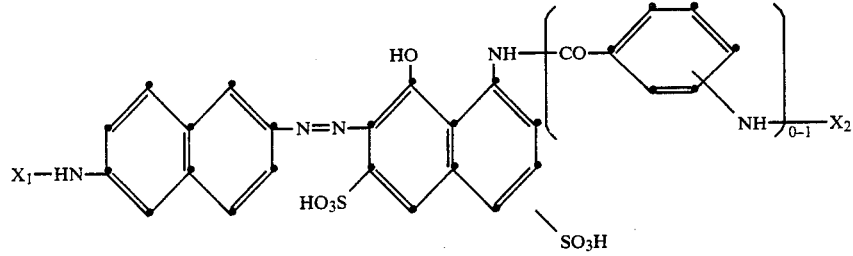
(17)
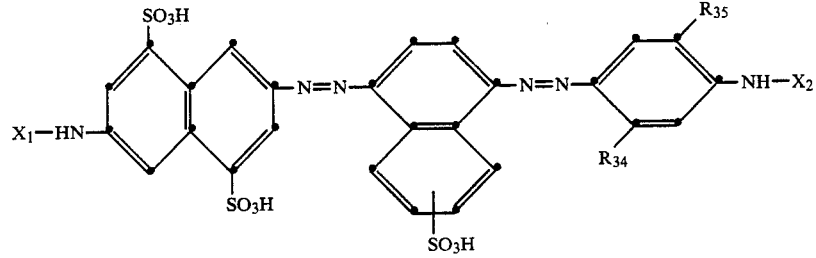
(18)
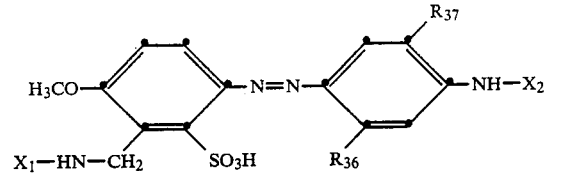
(19)
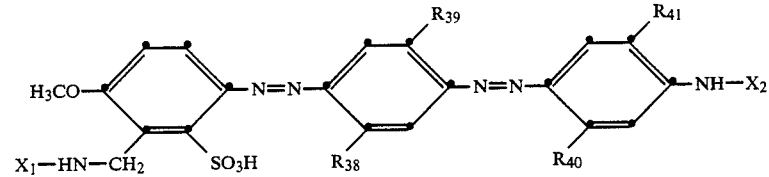
(20)
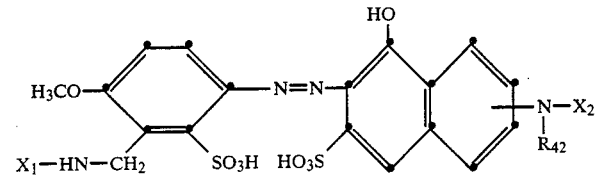
(21)

-continued
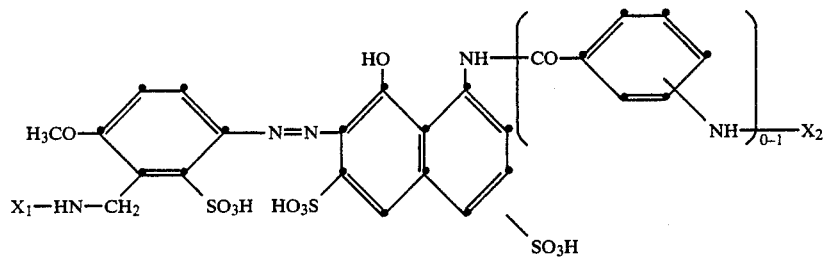 (22)
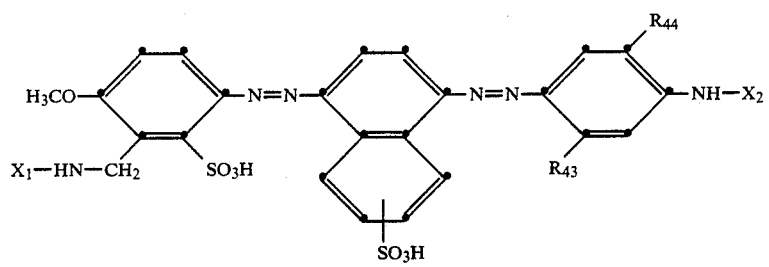 (23)
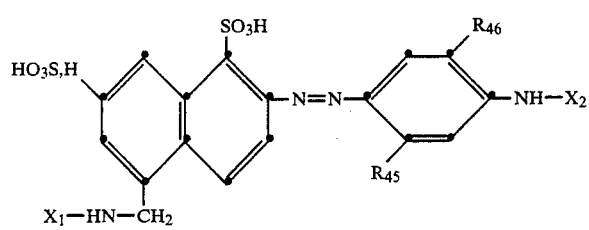 (24)
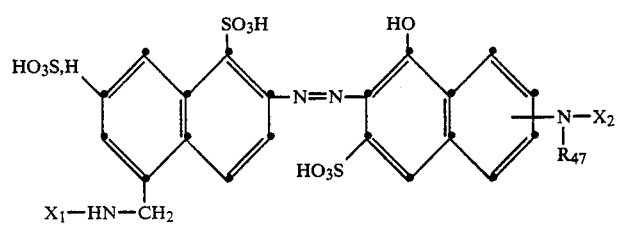 (25)
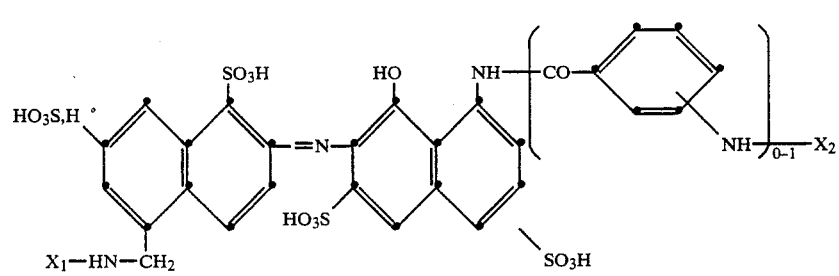 (26)
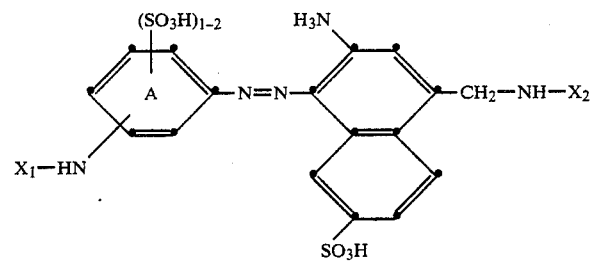 (27)

-continued
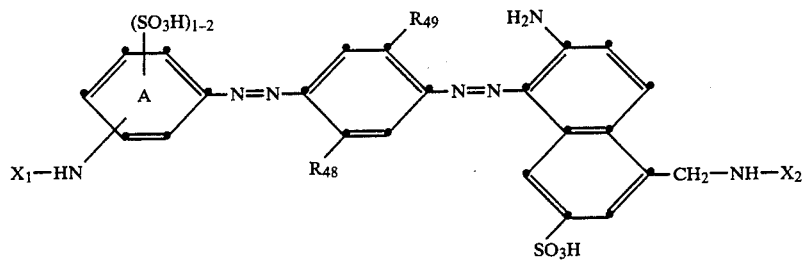
(28)
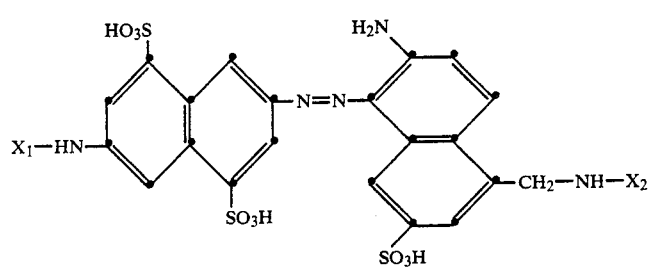
(29)
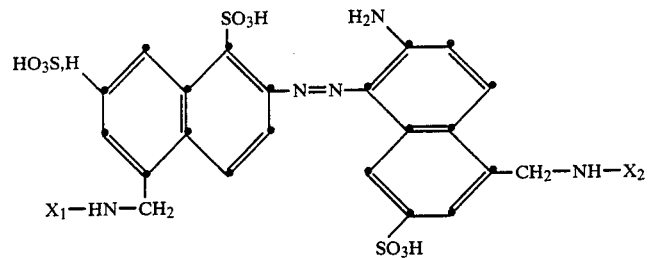
(30)
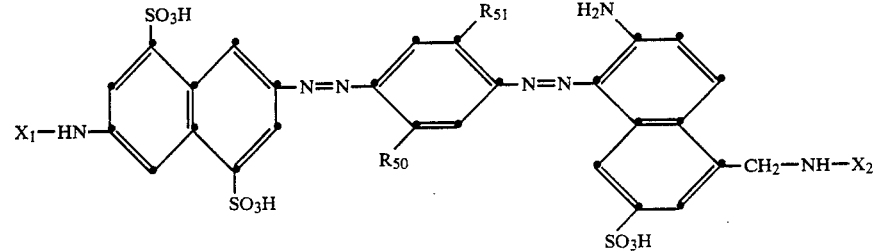
(31)
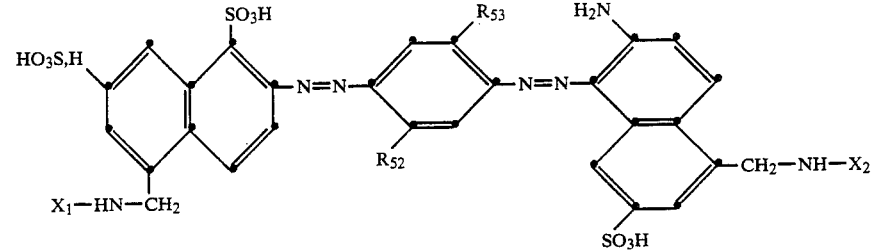
(32)
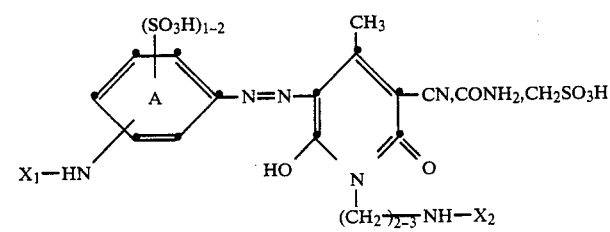
(33)

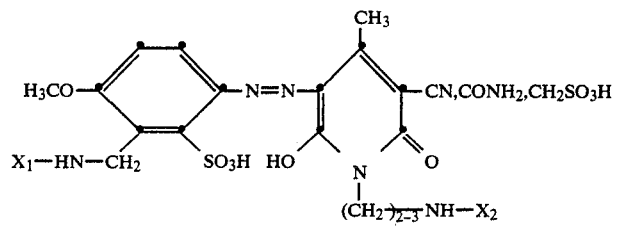
(34)
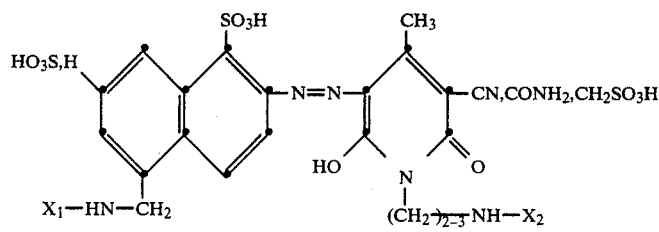
(35)
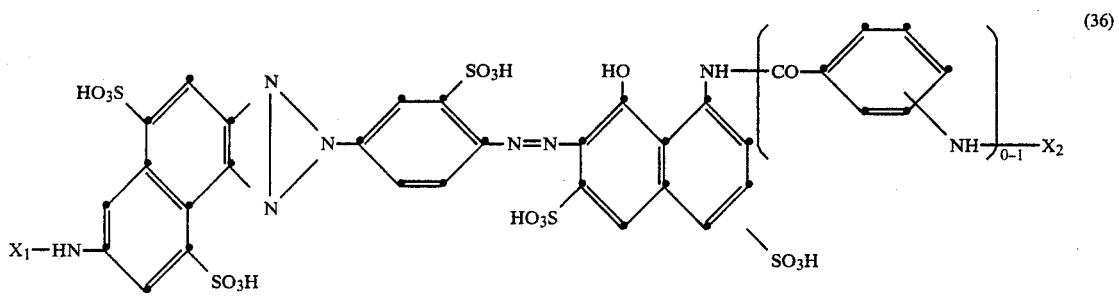
(36)
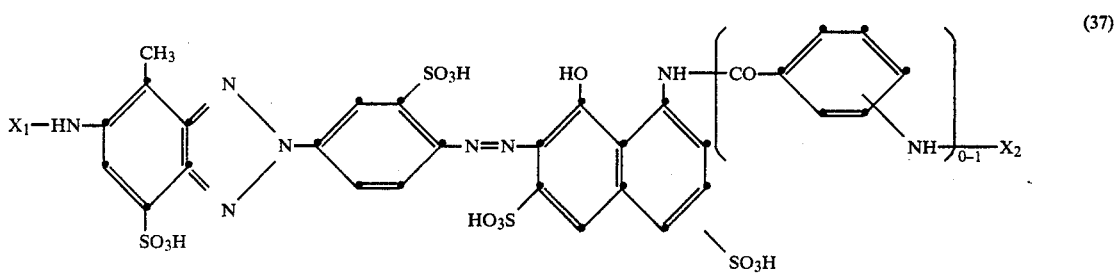
(37)
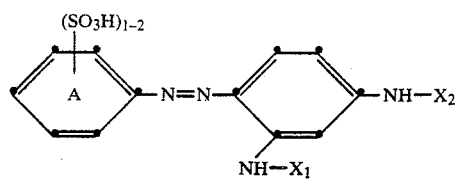
(38)
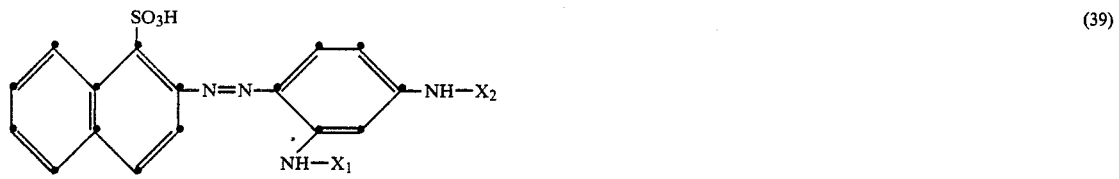
(39)
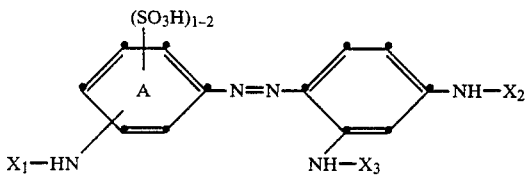
(40)

-continued
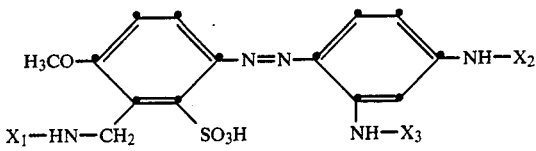
(41)
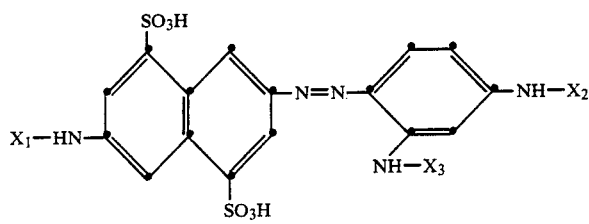
(42)
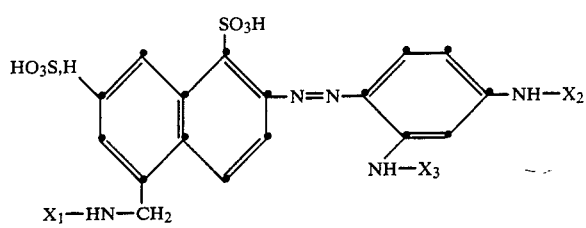
(43)
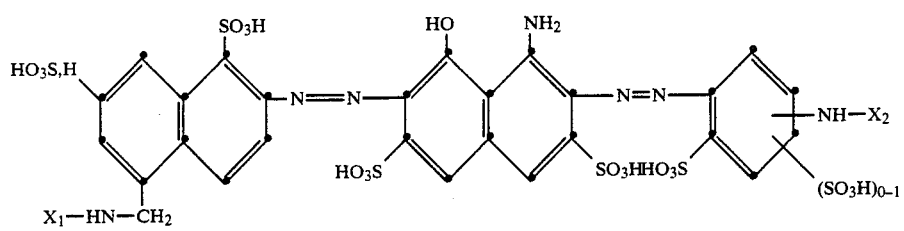
(44)
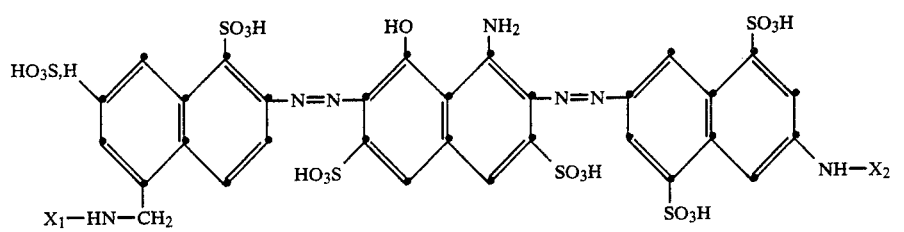
(45)
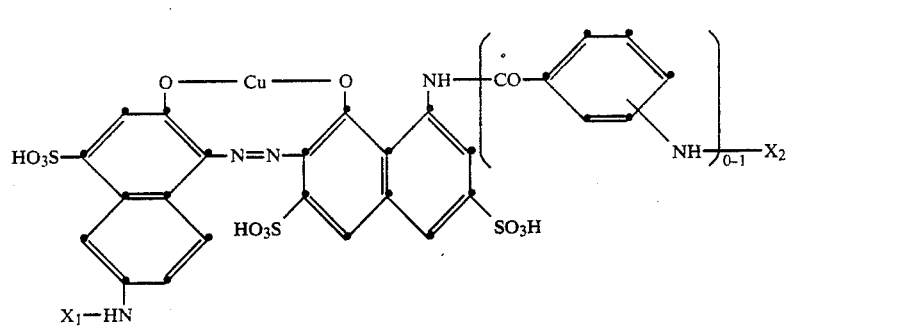
(46)
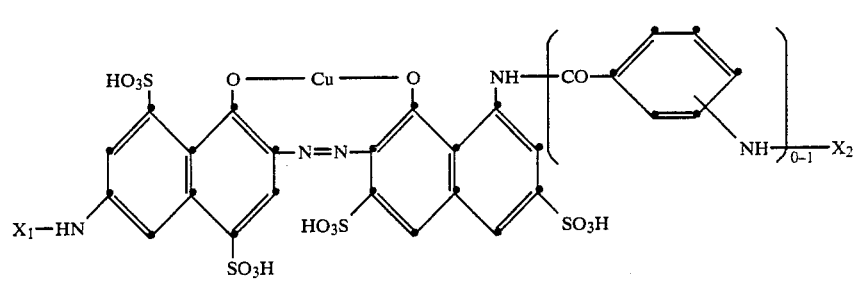
(47)
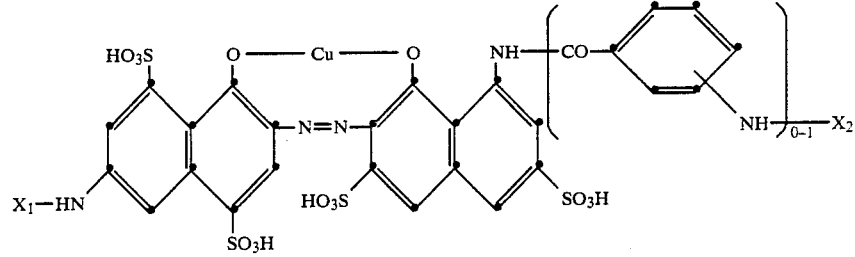
In formulae (5) to (47), the radicals $R_{22}$, $R_{23}$, $R_{42}$ and $R_{47}$ are hydrogen or $C_1-C_4$alkyl, the other radicals $R_6$ The benzene rings A are also preferably not further substituted in the preferred reactive dyes of the formulae (2) and (3), in which case the diazo components employed are in particular 1,3-phenylene-4-sulfonic acid, 1,4-phenylenediamine-2-sulfonic acid, 1,4-phenylenediamine-2,5-disulfonic acid or 1,3-phenylenediamine-4,6-disulfonic acid. The radical $R_3$ in formula (2) is in preferably hydrogen, methyl or ethyl.

Particularly preferred reactive dyes are those of the formulae (1) to (47), wherein $X_1$ is a radical of the formula (1), wherein the amino group $-NR_4R_5$ is: $-NH_2$, N-$\beta$-hydroxyethylamino, N,N-di-$\beta$-hydroxyethylamino, $\beta$-sulfoethylamino, phenylamino which may be substituted in the phenyl nucleus by chlorine, methyl, ethyl, methoxy, ethoxy, acetylamino, hydroxy, carboxy, sulfomethyl or sulfo, or is N-$C_1$-$C_4$alkyl-N-phenylamino which may be substituted in the phenyl nucleus by chlorine, methyl or ethyl, or is N-sulfo-$C_1$-$C_4$alkyl-N-phenylamino which may be substituted in the phenyl nucleus by chlorine, methyl or ethyl, or is N-hydroxy-$C_1$-$C_4$alkyl-N-phenylamino or sulfonaphthylamino, and $X_2$ is a 2,4-difluoro-5-chloropyrimid-6-yl radical.

Suitable reactive dyes are also reactive dyes of the formula (1), wherein one of the two radicals $-N(R_1)-X_1$ and $-N(R_2)-X_2$ or both radicals are attached to the chromophore through a radical of the formula

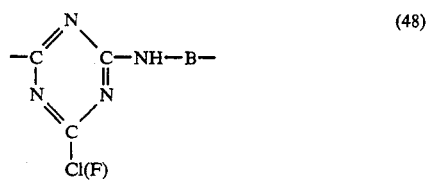

(48)

In this case the radical $-N(R_1)-X_1$ or $-N(R_2)-X_2$ is attached to B. B is an unsubstituted or substituted aliphatic or aromatic bridge member and is preferably an alkylene or arylene radical. B may therefore be a long chain (i.e. containing 10 or more carbon atoms) or short chain linear or branched alkylene radical, preferably a $C_2$-$C_6$alkylene radical, e.g. ethylene, propylene, butylene, hexylene or cyclohexylene. As an arylene radical B is e.g. a naphthylene radical, the radical of a diphenyl or stilbene, or is preferably a phenylene radical. The radical B can contain further substituents, e.g. halogen atoms such as fluorine, chlorine and bromine atoms, or $C_1$-$C_4$alkyl groups such as methyl, ethyl and propyl, or $C_1$-$C_4$alkoxy groups such as methoxy, ethoxy, propoxy and isopropoxy, or is carboxy or sulfo.

The process for the preparation of the reactive dyes of the formula (1) comprises reacting dyes of the formula

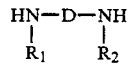

or precursors thereof, with reactive components for introducing the radicals $X_1$ and $X_2$, or converting the intermediates so obtained into the desired final dyes and, if desired, carrying out a further conversion reaction.

In the process for obtaining the preferred azo dyes the diazo components and the coupling components must together contain two amino groups $-N(R_1)H$ and $-N(R_2)H$ and optionally further acylatable amino groups. If desired, corresponding acetylamino or nitro compounds are used, wherein the acetylamino or nitro group respectively is converted by saponification or reduction into the $NH_2$ group before the condensation with a halotriazine, halopyrimidine or the like. The reactive radicals $X_1$ and $X_2$ are introduced by condensing dyes or dye precursors which contain acylatable groups with fibre-reactive halogenated acylating agents. The reactions for obtaining final dyes from precursors are normally coupling reactions which afford azo dyes.

As the order may differ in which the individual process steps described above are carried out, different variants of the process are possible. In general the reaction is carried out stepwise in succession, with the sequence of the simple reactions between individual reactants conveniently being in accordance with the special conditions. As hydrolysis of a halotriazine or halpyrimidine radical will occur under specific conditions, an intermediate which contains acetylamino groups must be saponified to remove the acetyl groups before condensation with an aminodifluorotriazine or trifluorotriazine etc. A further possible conversion reaction is e.g. the subsequent reaction of a dihalotriazinyl radical with an amine. Which reaction during the preparation of a secondary condensation product of an amine $HNR_4R_5$, 2,4,6-halotriazine and diaminobenzenesulfonic acid is best carried out first, viz. that of the trihalotriazine with the amine or with the diaminobenzenesulfonic acid, differs from case to case and depends in particular on the solubility of the amino compounds employed and the basicity of the amino groups to be acylated. The most important process variants are illustrated in the examples.

Possible starting materials which can be used for the preparation of the preferred reactive dyes of the formula (1), wherein D is the radical of a monoazo or polyazo dye, are listed individually below:

Diazo Components 1,3-diaminobenzene,
1,4-diaminobenzene,
1,3-diamino-4-chlorobenzene,
1,3-diamino-4-methylbenzene,
1,3-diamino-4-ethylbenzene,
1,3-diamino-4-methoxybenzene,
1,3-diamino-4-ethoxybenzene,
1,4-diamino-2-methylbenzene,
1,4-diamino-2-methoxybenzene,
1,4-diamino-2-ethoxybenzene,
1,4-diamino-2-chlorobenzene,
1,4-diamino-2,5-dimethylbenzene,
1,4-diamino-2,5-diethylbenzene,
1,4-diamino-2-methyl-5-methoxybenzene,
1,4-diamino-2,5-dimethoxybenzene,
1,4-diamino-2,5-diethoxybenzene,
2,6-diamino-napthalene, 1,3-diamino-2,4,6-trimethylbenzene,
1,4-diamino-2,3,5,6-tetramethylbenzene,
1,3-diamino-4-nitrobenzene,
4,4'-diaminostilbene,
4,4'-diaminodiphenylmethane,
4,4'diaminodiphenyl (benzidine),
3,3'-dimethylbenzidine,
3,3'-dimethoxybenzidine,
3,3'-dichlorobenzidine,
3,3'-dicarboxybenzidine,
3,3'-dicarboxymethoxybenzidine,
2,2'-dimethylbenzidine,
4,2'-diaminodiphenyl (diphenyline),
2,6-diaminonaphthalene-4,8-disulfonic acid,
1,4-diaminobenzene-2-sulfonic acid,
1,4-diaminobenzene-2,5-sulfonic acid,
1,4-diaminobenzene-2,6-disulfonic acid,
1,3-diaminobenzene-4-sulfonic acid,
1,3-diaminobenzene-4,6-disulfonic acid,
1,3-diamino-2-chlorobenzene-5-sulfonic acid,
1,4-diamino-2-methylbenzene-5-sulfonic acid,
1,5-diamino-6-methylbenzene-3-sulfonic acid,
1,3-diamino-6-methylbenzene-4-sulfonic acid,
3-(3'- or 4'-aminobenzoylamino)-1-aminobenzene-6-sulfonic acid,
1-(4'-aminobenzoylamino)-4-aminobenzene-2,5-disulfonic acid,
1,4-diaminobenzene-2-carboxylic acid,
1,3-diaminobenzene-4-carboxylic acid,
1,2-diaminobenzene-4-carboxylic acid,
1,3-diaminobenzene-5-carboxylic acid,
1,4-diamino-2-methylbenzene,
4,4-diaminodiphenyl oxide,
4,4'-diaminodiphenylurea-2,2'-disulfonic acid,
4,4'-diaminodiphenyloxyethane-2,2'-disulfonic acid,
4,4'-diaminostilbene-2,2'-disulfonic acid,
4,4'-diaminodiphenylethane-2,2'-disulfonic acid,
2-amino-5-aminonaphthalene-1-sulfonic acid,
2-amino-5-aminomethylnaphthalene-1,7-disulfonic acid,
1-amino-4-methoxy-5-aminomethylbenzene-6-sulfonic acid.

If an aminoacetylamino compound is to be used as diazo component instead of a diamine, from which compound the acetyl group is subsequently removed by saponification as explained above in the description of the process variants, it may be a monoacetyl compound of one of the diazo components listed above, e.g. 1-acetylamino-3-aminobenzene-4-sulfonic acid or 1-acetylamino-4-aminobenzene-3-sulfonic acid.

If both radicals —N(R$_1$)—X$_1$ and —N(R$_2$)—X$_2$ in formula (1) are attached to the same component, e.g. the coupling component, as described above, it is also possible to use as diazo components those which do not contain an acylatable amino group in addition to the amino group to be diazotised. Examples of such diazo components are: aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulfonamide, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7- 4,8- or -6,8-disulfonic acid, 1-aminonaphthalene-2,5,7-trisulfonic acid, 2-aminonaphthalene-1,5,7-, -3,6,8- or -4,6,8-trisulfonic acid, 4-aminobenzene-3,4'-disulfonic acid, 3-methoxy-4-amino-6-methylazobenzene-2',4'-disulfonic acid or 3-methoxy-4-amino-6-methylazobenzene-2',5'-disulfonic acid.

Coupling Components 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynapthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminophthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3-'-sulfophenylamino)-5-hydroxynaphthalene-7-sulfonic acid, 1-amino-8-hydroxynaphthalene-4-sulfonic acid, 2,4,6-triamino-3-cyanopyridine, 1-β-aminoethyl-3-cyano-4-methyl-6-hydroxypyrid-2-one, 1-γ-aminopropyl-3-sulfomethyl-4-methyl-6-hydroxypyrid-2-one, 1,3-diaminobenzene.

Reactive Components 2-methylsulfonyl-4-chloro-6-methylpyrimidine, 2,4-bis-methylsulfonyl-6-methylpyrimidine, 2,4,6-tri- or 2,4,5,6-tetrachloropyrimidine, 2,4,6-tri- or 2,4,5,6-tetrabromopyrimidine, 2-methylsulfonyl-4,6-dichloro-6-methylpyrimidine, 2,4-dichloropyrimidine-5-sulfonic acid, 5-nitro- or 5-cyano-2,4,6-trichloropyrimidine, 2,4-dichloro-5-chloromethyl-6-methylpyrimidine, 2,4-difluoro-5-chloro-6-methylpyrimidine, 2-methyl-5-methylsulfonyl-4,6-dichloropyrimidine, 2,4-dibromo-5-bromomethyl-6-methylpyrimidine, 2,4-dichloro-5-chloromethylpyrimidine, 2,4-dibromo-5-bromomethylpyrimidine, 2,5,6-trichloro-4-methylpyrimidine, 2,6-dichloro-4-trichloromethylpyrimidine, 2,4-bismethylsulfonyl-5-chloro-6-methylpyrimidine, 2,4,6-trimethylsulfonyl-1,3,5-triazine, 2,4-dichloropyrimidine, 3,6-dichloropyridazine, 2,6-dichloro- or 2,6-dibromo-4-carboethoxypyrimidine, 2,4,6-trichloropyrimidine, 2,4,5,6-tetrachloropyrimidine, 5-bromo-2,4,6-trichloropyrimidine, 5-acetyl-2,4,6-trichloropyrimidine, 5-nitro-6-methyl-2,4-dichloropyrimidine, 5-nitro-6-methyl-2,4-dichloropyrimidine, 2,4,6-trichloro-5-bromopyrimidine, 2,4,5,6-tetrafluoropyrimidine, 2,4,6-trichloro-5-cyanopyrimidine, 4,6-difluoro-5-chloropyrimidine, 2,4,6-trifluoro-5-chloropyrimidine, 2,4,5-trifluoropyrimidine, 2,4,6-tribromo-s-triazine, 2,4,6-trifluoro-s-triazine (cyanuric fluoride) and the primary condensation products of 2,4,6-trifluoro-s-triazine with the amines listed below, 2,4,6-trichloro-s-triazine (cyanuric chloride) or the primary condensation products of 2,4,6-trichloro-s-triazine with the amines or hydroxy compounds listed below.

Amines ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, phenethylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, o-, m- and p-aminophenol, 3- and 4-acetylaminoaniline, 2,5-dimethoxyaniline, o-, m- and p-anisidine, o-, m- and p-phenetidine, 2-methoxy-5-methylaniline, 2-ethoxy-5-methoxyaniline, 4-bromoaniline, 3-aminobenzamide, 4-aminophenylsulfamide, 3-trifluoromethylaniline, 3- and 4-aminophenylsulfamide, 3-trifluoromethylaniline, 3- and 4-aminophenylurea, 1-naphthylamine, 2-naphthylamine, orthanilic acid, metanilic acid, sulfanilic acid, aniline-2,4-disulfonic acid, aniline-2,5-disulfonic acid, aniline-3,5-disulfonic acid, anthranilic acid, m- and p-aminobenzoic acid, 4-aminophenylmethanesulfonic acid, aniline-N-methanesulfonic acid, 2-aminotoluene-4-sulfonic acid, 2-aminotoluene-5-sulfonic acid, p-aminosalicyclic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamino-2-, -3-, -4-, -5-, -6-, -7- and -8-sulfonic acid, 2-naphthylamino-1-, -3-, -4-, -5-, -6-, -7- and -8-sulfonic acid, 1-naphthylamino-2,4-, -2,5-, -2,7-, -2,8-, -3,5-, -3,6-, -3,7-, -3,8-, -4,6-, -4,7-, -4,8- and -5,8-disulfonic acid, 2-naphthylamino-1,5-, -1,6-, -1,7-, -3,6-, -3,7-, -4,7-, -4,8-, -5,7-, and -6,8-disulfonic acid, 1-naphthylamino-2,4,6-, 2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenthiazole, 5-, 6- and 8-aminoquinoline, 2-aminopyrimidine, morpholine, piperidine and piperazine.

Hydroxy Compounds

Methanol, ethanol, propanol, isopropanol, n-butanol, isobutanol, sec-butanol, tert-butanol, pentanol, hexanol, cyclohexanol, cyclohexanol, β-methoxyethanol, β-ethoxyethanol, γ-methoxypropanol, γ-ethoxypropanol, β'-ethoxy-β-ethoxyethanol, glycollic acid.

The diazotisation of the diazo components or of the intermediates which contain a diazotisable amino group is normally carried out by treatment with nitrous acid in an aqueous solution of mineral acid at low temperature. Coupling to the coupling component is carried out in the strongly acid, neutral or weakly alkaline pH range.

The condensation of the reactive components with the diazo components and the coupling components and with the amines or with acylatable monoazo or disazo intermediates, or with the dyes containing amino groups, is preferably carried out in aqueous solution or suspension, at low temperature and in the weakly acid, neutral or weakly alkaline pH range. Hydrogen halide evolved during the condensation is conveniently neutralised by the continuous addition of alkali metal hydroxides, carbonates or bicarbonates.

The reactive dyes of the formula (1) are fibre-reactive. By fibre-reactive compounds are meant those compounds which react with the hydroxyl groups of cellulose or with the amino groups of natural or synthetic polyamides to form covalent chemical bonds.

The reactive dyes of formula (1) are suitable for dyeing and printing a very wide range of materials such as silk, leather, wool, polyamide fibres and polyurethanes, and especially cellulosic fibre materials of all kinds. The reactive dyes of the formula (1) are also suitable for dyeing or printing fibres which contain hydroxyl groups and which are components of blended fabrics, e.g. of blends of cotton with polyester or polyamide fibres.

The dyes of this invention can be applied in different manner to the fibre material and fixed thereon, especially in the form of aqueous dye solutions and printing pastes. Examples of such fibre materials are natural cellulose fibres such as cotton, linen and hemp, as well as cellulose and regenerated cellulose. The reactive dyes of formula (1) are suitable both for the exhaust process and for dyeing by the pad dyeing process, in which the goods are impregnated with aqueous dye solutions which may also contain salts, and the dyes are fixed after treatment with alkali, or in the presence of alkali, with or without the application of heat. The dyes of this invention are particularly suitable for the so-called cold pad-batch method, which comprises applying the dye together with the alkali on the pad and subsequently fixing the dye by storing the impregnated goods for several hours at room temperature. After fixation the dyeings or prints are thoroughly rinsed with cold and hot water, if necessary with the addition of a compound which acts as a dispersant and promotes the diffusion of non-fixed dye.

The reactive dyes of the formula (1) are distinguished by high reactivity and good fixation. They can therefore be applied by the exhaust process at low dyeing temperatures and require only short steaming times when used in the pad-steam process. The degrees of fixation are high and non-fixed dye can be readily washed off. The difference between degree of exhaustion and degree of fixation is remarkably small, i.e. the soap loss is very small. The reactive dyes of the formula (1) are also particularly suitable for printing, especially on cotton, and for printing nitrogen-containing fibres, e.g. wool, silk or blends containing wool.

The dyeings and prints obtained with the dyes of this invention on cellulosic fabrics have excellent tinctorial strength and excellent dye-fibre bond stability both in acid and in alkaline medium, and they also have good lightfastness and very good wetfastness properties such as fastness to washing, water, sea-water, cross-dyeing and perspiration, as well as good fastness to pleating, ironing and rubbing.

The invention is illustrated by the following examples in which parts and percentages are by weight, unless otherwise stated. The ratio of parts by weight to parts by volume is the same as that of kilograms to liters.

The preparation of the monoazo or disazo intermediates is not described in all of the following Examples.

However, any undisclosed preparation is clearly evident from what has been stated above.

EXAMPLE 1

A mixture of 45.6 parts of diazotised 2-(3'-amino-4'-sulfophenylamino)-4-fluoro-6-(2''-sulfophenylamino)-1,3,5-triazine and 300 parts of water is added at 0° to 5° C. to 69.0 parts of a solution of the coupling component of the formula

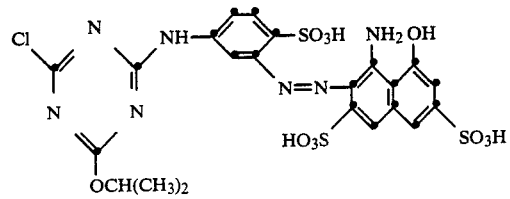

(prepared by coupling diazotised 2-(3'-amino-4'-sulfophenylamino)-4-chloro-6-isopropoxy-1,3,5-triazine to 1-amino-8-hydroxynaphthalene-3,6-disulfonic acid in acid medium) in 600 parts of water. Upon completion of the coupling reaction at pH 6.5 to 7.5, the reactive dye of the formula

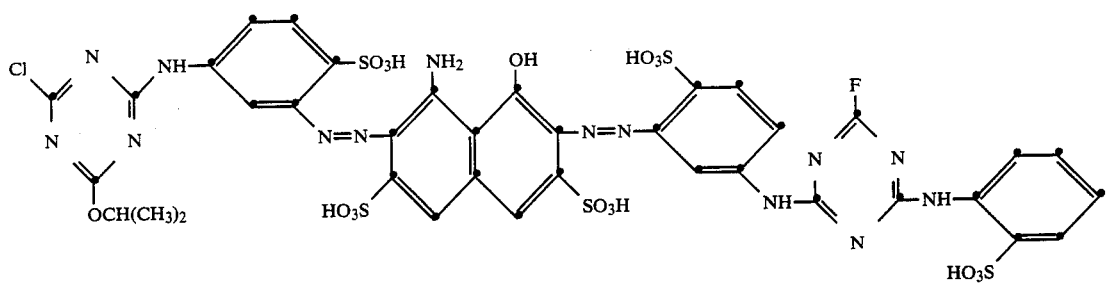

is isolated by concentrating or lyophilising the reaction solution at pH 7. It dyes cotton in blue shades.

Following the procedure described in this Example, further valuable reactive dyes which dye cotton in the shades indicated in column 5 of Table 1 are obtained by coupling the diazotised diazo component specified in column 2 to the coupling component of column 3, and coupling the diazotised diazo component listed in column 4 to the monoazo compound so obtained.

TABLE 1

| No. | Diazo component | Coupling component | Diazo component | Shade on cotton |
|---|---|---|---|---|
| 1 | 2-(3'-amino-4'-sulfophenyl-amino)-4-chloro-6-isopropoxy-1,3,5-triazine | 1-amino-8-hydroxynaph-thalene-3,6-disulfonic acid | 2-(3'-amino-4'-sulfophenylamino)-4-fluoro-6-(1'',5''-disulfonaphth-2''ylamino)-1,3,5-triazine | blue |
| 2 | 2-(3'-amino-4'-sulfophenyl-amino)-4-chloro-6-isopropoxy-1,3,5-triazine | 1-amino-8-hydroxynaph-thalene-3,6-disulfonic acid | 2-(4'-amino-2',5'-disulfophenyl-amino)-4-fluoro-6(1''-sulfo-naphth-2''-ylamino)-1,3,5-triazine | '' |
| 3 | 2-(3'-amino-4'-sulfophenyl-amino)-4-chloro-6-isopropoxy-1,3,5-triazine | 1-amino-8-hydroxynaph-thalene-3,6-disulfonic acid | 2-(3'-amino-4'-sulfophenylamino)-4-fluoro-6-(2'',5''-disulfophenyl-amino)-1,3,5-triazine | '' |
| 4 | 2-(3'-amino-4'-sulfophenyl-amino)-4-chloro-6-isopropoxy-1,3,5-triazine | 1-amino-8-hydroxynaph-thalene-3,6-disulfonic acid | 2-(4'-amino-2',5'-disulfophenyl-amino)-4-fluoro-6(2''-chloro-5''-sulfophenylamino)-1,3,5-triazine | '' |
| 5 | 2-(3'-amino-4'-sulfophenyl-amino)-4-chloro-6-isopropoxy-1,3,5-triazine | 1-amino-8-hydroxynaph-thalene-3,6-disulfonic acid | 2-(3'-amino-4'-sulfophenylamino)-4-fluoro-6-(N—ethyl-N—phenylamino)-1,3,5-triazine | '' |
| 6 | 2-(4'-amino-2',5'-disulfo-phenylamino)-4-chloro-6-iso-propoxy-1,3,5-triazine | 1-amino-8-hydroxynaph-thalene-3,6-disulfonic acid | 2-(3'-amino-4'-sulfophenylamino)-4-fluoro-6-(1'',5''-disulfonaphth-2''-ylamino)-1,3,5-triazine | greenish blue |
| 7 | 2-(4'-amino-2',5'-disulfo- | 1-amino-8-hydroxynaph- | 2-(4'-amino-2',5'-disulfophenyl- | '' |

| No. | Diazo component | Coupling component | Diazo component | Shade on cotton |
|---|---|---|---|---|
|  | phenylamino)-4-chloro-6-isopropoxy-1,3,5-triazine | thalene-3,6-disulfonic acid | amino)-4-fluoro-6(1″-sulfonaphth-2″-ylamino)-1,3,5-triazine |  |
| 8 | 2-(4′-amino-2′,5′-disulfophenylamino)-4-chloro-6-isopropoxy-1,3,5-triazine | 1-amino-8-hydroxynaphthalin-3,6-disulfonic acid | 2-(3′-amino-4′-sulfophenylamino)-4-fluoro-6-(2″,5″-disulfophenylamino)-1,3,5-triazine | greenish blue |
| 9 | 2-(4′-amino-2′,5′-disulfophenylamino)-4-chloro-6-isopropoxy-1,3,5-triazine | 1-amino-8-hydroxynaphthalin-3,6-disulfonic acid | 2-(4′-amino-2′,5′-disulfophenylamino)-4-fluoro-6(2″-chloro-5″-sulfophenylamino)-1,3,5-triazine | ″ |
| 10 | 2-(4′-amino-2′,5′-disulfophenylamino)-4-chloro-6-isopropoxy-1,3,5-triazine | 1-amino-8-hydroxynaphthalin-3,6-disulfonic acid | 2-(3′-amino-4′-sulfophenylamino)-4-fluoro-6-(N—ethyl-N—phenylamino)-1,3,5-triazine | ″ |
| 11 | 2-(4′-amino-2′,5′-disulfophenylamino)-4-chloro-6-isopropoxy-1,3,5-triazine | 1-amino-8-hydroxynapthalin-3,6-disulfonic acid | 2-(3′-amino-4′-sulfophenylamino)-4-fluoro-6-(2″-sulfophenylamino)-1,3,5-triazine | ″ |
| 12 | 2-(4′-amino-3′-sulfophenylamino)-4-chloro-6-($\beta$-ethoxyethoxy)-1,3,5-triazin | 1-amino-8-hydroxynaphthalin-3,6-disulfonic acid | 2-(3′-amino-4′-sulfophenylamino)-4-fluoro-8(1″,5″-disulfonaphth-2″-ylamino)-1,3,5-triazine | ″ |
| 13 | 2-(4′-amino-3′-sulfophenylamino)-4-chloro-6-($\beta$-ethoxyethoxy)-1,3,5-triazin | 1-amino-8-hydroxynaphthalin-3,6-disulfonic acid | 2-(4′-amino-2′,5′-disulfophenylamino)-4-fluoro-6-(1″-sulfonaphth-2″-ylamino)-1,3,5-triazine | ″ |
| 14 | 2-(4′-amino-3′-sulfophenylamino)-4-chloro-6-($\beta$-ethoxyethoxy)-1,3,5-triazin | 1-amino-8-hydroxynaphthaline-3,6-disulfonic acid | 2-(3′-amino-4′-sulfophenylamino-4-fluoro-6-(2″,5″-disulfophenylamino)-1,3,5-triazine | ″ |
| 15 | 2-(4′-amino-3′-sulfophenylamino)-4-chloro-6-($\beta$-ethoxyethoxy)-1,3,5-triazine | 1-amino-8-hydroxynaphthalene-3,6-disulfonic acid | 2-(4′40 -amino-2′,5′-disulfophenylamino)-4-fluoro-6-(2″-chloro-5″-sulfophenylamino)-1,3,5-triazine | greenish blue |
| 16 | 2-(4′-amino-3′-sulfophenylamino)-4-chloro-6-($\beta$-ethoxyethoxy)-1,3,5-triazine | 1-amino-8-hydroxynaphthalene-3,6-disulfonic acid | 2-(3′-amino-4′-sulfophenylamino)-4-fluoro-6-(N—ethyl-N—phenylamino)-1,3,5-triazine | blue |
| 17 | 2-(4′-amino-3′-sulfophenylamino)-4-chloro-6-($\beta$-ethoxyethoxy)-1,3,5-triazine | 1-amino-8-hydroxynaphthalene-3,6-disulfonic acid | 2-(3′-amino-4′-sulfophenylamino)-4-fluoro-6-(2″-sulfophenylamino)-1,3,5-triazine | ″ |
| 18 | 2-(3′-amino-4′-sulfophenylamino)-4-fluoro-6-(1″,5″-disulfonaphth-2″-ylamino)-1,3,5-triazine | 1-amino-8-hydroxynaphthalene-3,6-disulfonic acid | 2-(4′-amino-3′-sulfophenylamino)-4-chloro-6-($\beta$-ethoxyethoxy)-1,3,5-triazine | ″ |
| 19 | 2-(3′-amino-4′-sulfophenylamino)-4-fluoro-6-(1″,5″-disulfonaphth-2″-ylamino)-1,3,5-triazine | 1-amino-8-hydroxynaphthalene-3,6-disulfonic acid | 2-(3′-amino-4′-sulfophenylamino)-4-chloro-6-isopropoxy-1,3,5-triazine | ″ |
| 20 | 2-(3′-amino-4′-sulfophenylamino)-4-fluoro-6-(1″,5″-disulfonaphth-2″-ylamino)-1,3,5-triazine | 1-amino-8-hydroxynaphthalene-3,6-disulfonic acid | 2-(4′-amino-2′,5′-disulfophenylamino)-4-chloro-6-isopropoxy-1,3,5-triazine | ″ |
| 21 | 2-(4′-amino-2′,5′-disulfophenylamino)-4-fluoro-6-(1″-sulfonaphth-2″-ylamino)-1,3,5-triazine | 1-amino-8-hydroxynaphthalene-3,6-disulfonic acid | 2-(4′-amino-3′-sulfophenylamino)-4-chloro-6-($\beta$-ethoxyethoxy)-1,3,5-triazine | greenish blue |
| 22 | 2-(4′-amino-2′,5′-disulfophenylamino)-4-fluoro-6-(1″-sulfonaphth-2″-ylamino)-1,3,5-triazine | 1-amino-8-hydroxynaphthalene-3,6-disulfonic acid | 2-(3′-amino-4′-sulfophenylamino)-4-chloro-6-isopropoxy-1,3,5-triazine | greenish blue |
| 23 | 2-(4′-amino-2′,5′-disulfophenylamino)-4-fluoro-6-(1″-sulfonaphth-2″-ylamino)-1,3,5-triazine | 1-amino-8-hydroxynaphthalene-3,6-disulfonic acid | 2-(4′-amino-2′,5′-disulfophenylamino)-4-chloro-6-isopropoxy-1,3,5-triazine | ″ |
| 24 | 2-(3′-amino-4′-sulfophenylamino)-4-fluoro-6-(2″,5″-disulfophenylamino)-1,3,5-triazine | 1-amino-8-hydroxynaphthalene-3,6-disulfonic acid | 2-(4-amino-3′-sulfophenylamino)-4-chloro-6-($\beta$-ethoxyethoxy)-1,3,5-triazine | blue |
| 25 | 2-(3′-amino-4′-sulfophenylamino)-4-fluoro-6-(2″,5″-disulfophenylamino)-1,3,5-triazine | 1-amino-8-hydroxynaphthalene-3,6-disulfonic acid | 2-(3′-amino-4′-sulfophenylamino)-4-chloro-6-isopropoxy-1,3,5-triazine | ″ |
| 26 | 2-(3′-amino-4′-sulfophenylamino)-4-fluoro-6-(2″,5″-disulfophenylamino)-1,3,5-triazine | 1-amino-8-hydroxynaphthalene-3,6-disulfonic acid | 2-(4′-amino-2′,5′-disulfophenylamino)-4-chloro-6-isopropoxy-1,3,5-triazine | ″ |
| 27 | 2(4′-amino-2′,5′-disulfophenylamino)-4-fluoro-6-(2″-chloro-5″-sulfophenylamino)-1,3,5-triazine | 1-amino-8-hydroxynaphthalene-3,6-disulfonic acid | 2-(4′-amino-3′-sulfophenylamino)-4-chloro-6-($\beta$-ethoxyethoxy)-1,3,5-triazine | greenish blue |

TABLE 1-continued

| No. | Diazo component | Coupling component | Diazo component | Shade on cotton |
|---|---|---|---|---|
| 28 | 2(4'-amino-2',5'-disulfophenylamino)-4-fluoro-6-(2''-chloro-5''-sulfophenylamino)-1,3,5-triazine | 1-amino-8-hydroxynaphthalene-3,6-disulfonic acid | 2-(3'-amino-4'-sulfophenylamino)-4-chloro-6-isopropoxy-1,3,5-triazine | blue |
| 29 | 2-(4'-amino-2',5'-disulfophenylamino)-4-fluoro-6-(2''-chloro-5'-sulfophenylamino)-1,3,5-triazine | 1-amino-8-hydroxynaphthalene-3,6-disulfonic acid | 2-(4'-amino-2',5'-disulfophenylamino)-4-chloro-6-isopropoxy-1,3,5-triazine | greenish blue |
| 30 | 2-(3'-amino-4'-sulfophenylamino)-4-fluoro-6-(2''-sulfophenylamino)-1,3,5-triazine | 1-amino-8-hydroxynaphthalene-3,6-disulfonic acid | 2-(4'-amino-3'-sulfophenylamino)-4-chloro-6-(β-ethoxyethoxy)-1,3,5-triazine | blue |
| 31 | 2-(3'-amino-4'-sulfophenylamino)-4-fluoro-6-(2''-sulfophenylamino)-1,3,5-triazine | 1-amino-8-hydroxynaphthalene-3,6-disulfonic acid | 2-(3'-amino-4'-sulfophenylamino)-4-chloro-6-isopropoxy-1,3,5-triazine | " |
| 32 | 2-(3'-amino-4'-sulfophenylamino)-4-fluoro-6-(2''-sulfophenylamino)-1,3,5-triazine | 1-amino-8-hydroxynaphthalene-3,6-disulfonic acid | 2-(4'-amino-2',5'-disulfophenylamino)-4-chloro-6-isopropoxy-1,3,5-triazine | " |
| 33 | 2-(3'-amino-4'-sulfophenylamino)-4-fluoro-6-(N—ethyl-N—phenylamino)-1,3,5-triazine | 1-amino-8-hydroxynaphthalene-3,6-disulfonic acid | 2-(4'-amino-3'-sulfophenylamino)-4-chloro-6-(β-ethoxyethoxy)-1,3,5-triazine | " |
| 34 | 2-(3'-amino-4'-sulfophenylamino)-4-fluoro-6-(N—ethyl-N—phenylamino)-1,3,5-triazine | 1-amino-8-hydroxynaphthalene-3,6-disulfonic acid | 2-(3'-amino-4'-sulfophenylamino)-4-chloro-6-isopropoxy-1,3,5-triazine | " |
| 35 | 2-(3'-amino-4'-sulfophenylamino)-4-fluoro-6-(N—ethyl-N—phenylamino)-1,3,5-triazine | 1-amino-8-hydroxynaphthalene-3,6-disulfonic acid | 2-(4-amino-2',5'-disulfophenylamino)-4-chloro-6-isopropoxy-1,3,5-triazine | dp- |
| 36 | 2-(4'-amino-2',5-disulfophenylamino)-4-chloro-6-isopropoxy-1,3,5-triazine | 1-amino-8-hydroxynaphthalene-4,6-disulfonic acid | 2-(4'-amino-2',5'-disulfophenylamino)-4-fluoro-6-(2'',5''-disulfophenylamino)-1,3,5-triazine | greenish blue |

EXAMPLE 2

23.9 parts of 2-amino-5-hydroxynaphthalene-7-sulfonic acid are dissolved in 800 ml of water to form a neutral solution. Then 22.9 parts of 2,4-dichloro-6-isopropoxy-1,3,5-triazine are added dropwise at 45° C. while keeping the pH of the reaction mixture at 7.0–7.5 by simultaneously adding 2N sodium hydroxide solution. When the reaction is complete, a mixture of 45.6 parts of diazotised 2-(3'-amino-4'-sulfophenylamino)-4-fluoro-6-(2''-sulfophenylamino)-1,3,5-triazine and 300 parts of water is added. Upon completion of the coupling reaction at pH 6.5–7.5, the reactive dye of the formula

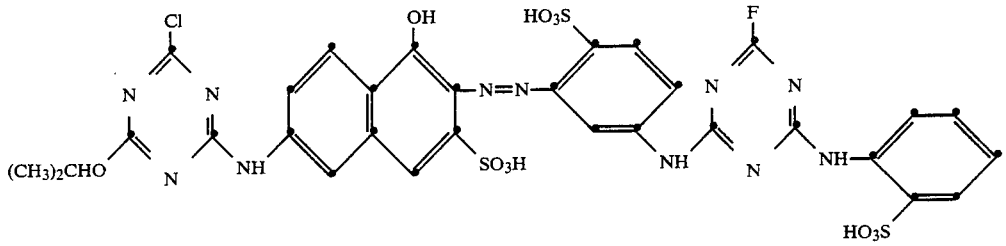

is isolated by concentrating the reaction mixture at pH 7. It dyes cotton in orange shades.

Following the procedure described in this example, further valuable reactive dyes which dye cotton in the shade indicated in column 5 of Table 2 are obtained by acylating the coupling component of column 2 with the acylating agent of column 3, and coupling the diazotised diazo component of column 4 to the intermediate so obtained.

TABLE 2

| No. | Coupling component | Acylating agent | Diazo component | Shade on cotton |
|---|---|---|---|---|
| 1 | 2-amino-5-hydroxynaphthalene-7-sulfonic acid | 2,4-dichloro-6-isopropoxy-1,3,5-triazine | 2-(3'-amino-4'-sulfophenylamino)-4-fluoro-6-(1'',5''-disulfonaphth-2''-ylamino)-1,3,5-triazine | orange |
| 2 | 2-amino-5-hydroxynaphthalene-7-sulfonic acid | 2,4-dichloro-6-isopropoxy-1,3,5-triazine | 2-(4'-amino-2',5'-disulfophenylamino)-4-fluoro-6-(1''-sulfonaphth-2''-ylamino)-1,3,5-triazine | " |
| 3 | 2-amino-5-hydroxynaphtha-lene-7-sulfonic acid | 2,4-dichloro-6-isopropoxy-1,3,5-triazine | 2-(3'-amino-4'-sulfophenylamino)-4-fluoro-6-(2'',5''-disulfophenylamino)-1,3,5-triazine | " |

TABLE 2-continued

| No. | Coupling component | Acylating agent | Diazo component | Shade on cotton |
|---|---|---|---|---|
| 4 | 2-amino-5-hydroxynaphthalene-7-sulfonic acid | 2,4-dichloro-6-isopropoxy-1,3,5-triazine | 2-(4'-amino-2',5'-disulfophenyl-amino)-4-fluoro-6-(2''-chloro-5''-sulfophenylamino)-1,3,5-triazine | " |
| 5 | 2-amino-5-hydroxynaphthalene-7-sulfonic acid | 2,4-dichloro-6-isopropoxy-1,3,5-triazine | 2-(3'-amino-4'-sulfophenylamino)-4-fluoro-6-(N—ethyl-N—phenyl-amino)-1,3,5-triazine | " |
| 6 | 2-amino-5-hydroxynaphthalene-7-sulfonic cid | 2,4-dichloro-6-(β-ethoxy-ethoxy)-1,3,5-triazine | 2-(3'-amino-4'-sulfophenylamino)-4-fluoro-6-(1'',5''-disulfonaphth-2''-ylamino)-1,3,5-triazine | " |
| 7 | 2-amino-5-hydroxynaphthalene-7-sulfonic acid | 2,4-dichloro-6-(β-ethoxy-ethoxy)-1,3,5-triazine | 2-(4'-amino-2',5'-disulfophenyl-amino)-4-fluoro-6-(1''-sulfonaphth-2''-ylamino)-1,3,5-triazine | " |
| 8 | 2-amino-5-hydroxynaphthalene-7-sulfonic acid | 2,4-dichloro-6-(β-ethoxy-ethoxy)-1,3,5-triazine | 2-(3'-amino-4'-sulfophenylamino)-4-fluoro-6-(2'',5''-disulfophenyl-amino)-1,3,5-triazine | " |
| 9 | 2-amino-5-hydroxynaphthalene-7-sulfonic acid | 2,4-dichloro-6-(β-ethoxy-ethoxy)-1,3,5-triazine | 2-(4'-amino-2',5'-disulfophenyl-amino)-4-fluoro-6-(2''-chloro-5''-sulfophenylamino)-1,3,5-triazine | orange |
| 10 | 2-amino-5-hydroxynaphthalene-7-sulfonic acid | 2,4-dichloro-6-β-ethoxy-ethoxy)-1,3,5-triazine | 2-(3'-amino-4'-sulfophenylamino)-4-fluoro-6-(N—ethyl-N—phenyl-amino)-1,3,5-triazine | " |
| 11 | 2-amino-5-hydroxynaphthalene-7-sulfonic acid | 2,4-dichloro-6-(β-ethoxy-ethoxy)-1,3,5-triazine | 2-(3'-amino-4'-sulfophenylamino)-4-fluoro-6-(2''-sulfophenylamino)-1,3,5-triazine | " |
| 12 | 3-amino-5-hydroxynaphthalene-7-sulfonic acid | 2,4-dichloro-6-(β-ethoxy-ethoxy)-1,3,5-triazine | 2-(3'-amino-4'-sulfophenylamino)-4-fluoro-6-(1'',5''-disulfonaphth-2''-ylamino)-1,3,5-triazine | " |
| 13 | 3-amino-5-hydroxynaphthalene-7-sulfonic acid | 2,4-dichloro-6-(β-ethoxy-ethoxy)-1,3,5-triazine | 2-(4'-amino-2',5'-disulfophenyl-amino)-4-fluoro-6-(1''-sulfonaphth-2''-ylamino)-1,3,5-triazine | red |
| 14 | 3-amino-5-hydroxynaphthalene-7-sulfonic acid | 2,4-dichloro-6-(β-ethoxy-ethoxy)-1,3,5-triazine | 2-(3'-amino-4'-sulfophenylamino)-4-fluoro-6-(2'',5''-disulfophenyl-amino)-1,3,5-triazine | orange |
| 15 | 3-amino-5-hydroxynaphthalene-7-sulfonic acid | 2,4-dichloro-6-(β-ethoxy-ethoxy)-1,3,5-triazine | 2-(4'-amino-2',5'-disulfophenyl-amino)-4-fluoro-6-(2''-chloro-5''-sulfophenylamino)-1,3,5-triazine | red |
| 16 | 3-amino-5-hydroxynaphthalene-7-sulfonic acid | 2,4-dichloro-6-(β-ethoxy-ethoxy)-1,3,5-triazine | 2-(3'-amino-4'-sulfophenylamino)-4-fluoro-6-(N—ethyl-N—phenyl-amino)-1,3,5-triazine | orange |
| 17 | 3-amino-5-hydroxynaphthalene-7-sulfonic acid | 2,4-dichloro-6-(β-ethoxy-ethoxy)-1,3,5-triazine | 2-(3'amino-4'-sulfophenylamino)-4-fluoro-6-(2''-sulfophenylamino)-1,3,5-triazine | orange |
| 18 | 3-amino-5-hydroxynaphthalene-7-sulfonic acid | 2,4-dichloro-6-iso-propoxy-1,3,5-triazine | 2-(3'-amino-4'-sulfophenylamino)-4-fluoro-6-(1'',5''-disulfonaphth-2''-ylamino)-1,3,5-triazine | " |
| 19 | 3-amino-5-hydroxynaphthalene-7-sulfonic acid | 2,4-dichloro-6-iso-propoxy-1,3,5-triazine | 2-(4'-amino-2',5'-disulfophenyl-amino)-4-fluoro-6-(1''-sulfonaphth-2''-ylamino)-1,3,5-triazine | red |
| 20 | 3-amino-5-hydroxynaphthalene-7-sulfonic acid | 2,4-dichloro-6-iso-propoxy-1,3,5-triazine | 2-(3'-amino-4'-sulfophenylamino)-4-fluoro-6-(2'',5''-disulfophenyl-amino)-1,3,5-triazine | orange |
| 21 | 3-amino-5-hydroxynaphthalene-7-sulfonic acid | 2,4-dichloro-6-iso-propoxy-1,3,5-triazine | 2-(4'-amino-2',5'-disulfophenyl-amino)-4-fluoro-6-(2''-chloro-5''-sulfophenylamino)-1,3,5-triazine | red |
| 22 | 3-amino-5-hydroxynaphthalene-7-sulfonic acid | 2,4-dichloro-6-iso-propoxy-1,3,5-triazine | 2-(3'-amino-4-sulfophenylamino)-4-fluoro-6-(N—ethyl-N—phenyl-amino)-1,3,5-triazine | orange |
| 23 | 3-amino-5-hydroxynaphthalene-7-sulfonic acid | 2,4-dichloro-6-iso-propoxy-1,3,5-triazine | 2-(3'-amino-4'-sulfophenylamino)-4-fluoro-6-(2''-sulfophenylamino)-1,3,5-triazine | " |

EXAMPLE 3

23.9 parts of 2-amino-hydroxynaphthalene-7-sulfonic acid are dissolved in 800 ml of water to form a neutral solution, which is cooled to 10° C. Upon addition of a neutral mixture of 28.8 parts of difluoro-6-(2'-sulfophenylamino)-1,3,5-triazine and 300 ml of water, the temperature is raised to 20°-25° C. over 2 to 3 hours while keeping the pH of the reaction mixture at 7.0–7.5 by the constant addition of 2N sodium hydroxide solution. When the reaction is complete, a mixture of 36.0 parts of diazotised 2-(3'-amino-4'-sulfophenylamino)-4-chloro-6-isopropoxy-1,3,5-triazine and 300 parts of water is added. Upon completion of the coupling reaction at pH 66.5–7.5, the reactive dye of the formula

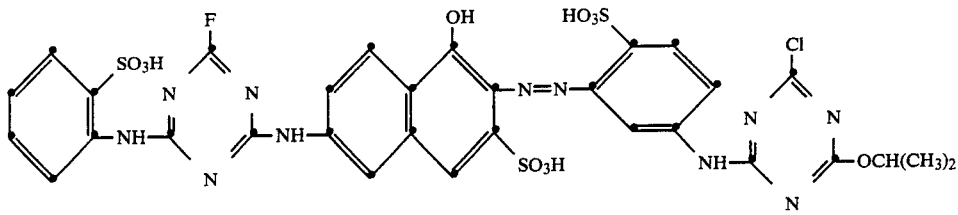

is isolated by concentrating the reaction solution at pH 7. It dyes cotton in orange shades.

Following the procedure described in this Example, further valuable reactive dyes which dye cotton in the shade indicated in column 5 of Table 3 are obtained by acylating the coupling component of column 2 with the acylating agent of column 3 and coupling the diazotised diazo component of column 4 to the intermediate so obtained.

slightly acid to Congo red by constant addition of 2N sodium hydroxide solution and then kept at 5 to 6 while raising the temperature to 20°–25° C. over 2 to 3 hours. When the reaction is complete, this intermediate is coupled to 36.0 parts of diazotised 2-(3'-aminmo-4'-sulfophenylamino)-4-chloro-6-isopropoxy-1,3,5-triazine at 0°–10° C. and pH 5. Upon completion of the coupling reaction at pH 7, the reaction mixture is clarified and the reactive dye of the formula

TABLE 3

| No. | Coupling component | Acylating agent | Diazo component | Shade on cotton |
|---|---|---|---|---|
| 1 | 2-amino-5-hydroxynaphthalene-7-sulfonic acid | 2,4-difluoro-6-(1',5'-disulfonaphth-2'-ylamino)-1,3,5-triazine in fresh aqueous reaction solution | 2-(3'-amino-4'-sulfophenylamino)-4-chloro-6-isopropoxy-1,3,5-triazine | orange |
| 2 | 2-amino-5-hydroxynaphthalene-7-sulfonic acid | 2,4-difluoro-6-(1',5'-disulfonaphth-2'-ylamino)-1,3,5-triazine in fresh aqueous reaction solution | 2-(4'-amino-2',5'-disulfophenylamino)-4-chloro-6-isopropoxy-1,3,5-triazine | " |
| 3 | 3-amino-5-hydroxynaphthalene-7-sulfonic acid | 2,4-difluoro-6-(1',5'-disulfonaphth-2'-ylamino)-1,3,5-triazine in fresh aqueous reaction solution | 2-(3'-amino-4'-sulfophenylamino)-4-chloro-6-(β-ethoxyethoxy)-1,3,5-triazine | " |
| 4 | 3-amino-5-hydroxynaphthalene-7-sulfonic acid | 2,4-difluoro-6-(1',5'-disulfonaphth-2'-ylamino)-1,3,5-triazine in fresh aqueous reaction solution | 2-(4'-amino-2',5'-disulfophenylamino)-4-chloro-6-(β-ethoxyethoxy)-1,3,5-triazine | red |

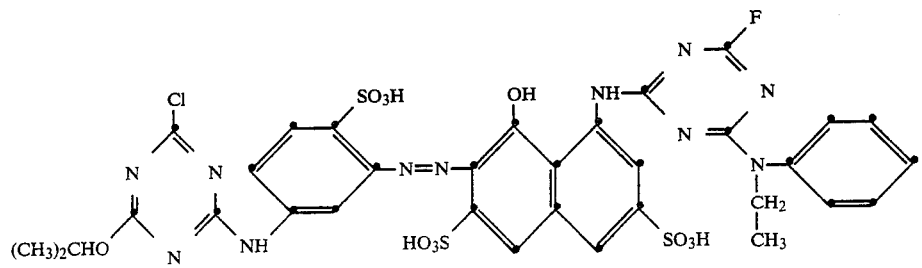

EXAMPLE 4

31.9 parts of 1-amino-8-hydroxynaphthalene-3,6-disulfonic acid are dissolved in 800 ml of water to form a neutral solution, which is cooled to 0°–5° C. At this temperature 14.2 parts of 2,4,6-trifluoro-1,3,5-triazine are added dropwise over 20 minutes while keeping the pH of the reaction mixture slightly acid to Congo red by the simultaneous addition of 2N sodium hydroxide solution. Upon addition of a mixture, adjusted to pH 5, of 13.3 parts of N-ethylaminobenzene and 100 ml of water, the pH of the reaction solution is initially kept is isolated by concentrating or lyophilising the reaction solution at pH 7.

Following the procedure described in this Example, further valuable reactive dyes which dye cotton in the shades indicated in column 5 of Table 4 are obtained by reacting the coupling component of column 2 first with 2,4,6-trifluoro-1,3,5-triazine and then with the amino compound of column 3, and coupling the diazotised diazo component of column 4 to the intermediate so obtained.

TABLE 4

| No. | Coupling component | Amino compound | Diazo component | Shade on cotton |
|---|---|---|---|---|
| 1 | 1-amino-8-hydroxynaphthalene-3,6-disulfonic acid | N—ethylaminobenzene | 2-(3'-amino-4'-sulfophenylamino)-4-chloro-6-(β-ethoxyethoxy)-1,3,5-triazine | red |
| 2 | 1-amino-8-hydroxynaph- | N—ethylamino- | 2-(4'-amino-2',5'-disulfophenylamino)- | bluish red |

TABLE 4-continued

| No. | Coupling component | Amino compound | Diazo component | Shade on cotton |
|---|---|---|---|---|
|  | thalene-3,6-disulfonic acid | benzene | 4-chloro-6-isopropoxy-1,3,5-triazine |  |
| 3 | 1-amino-8-hydroxynaphthalene-3,6-disulfonic acid | β-hydroxyethylamine | 2-(4'-amino-2',5'-disulfophenylamino)-4-chloro-6-isopropoxy-1,3,5-triazine | " |
| 4 | 1-amino-8-hydroxynaphthalene-3,6-disulfonic acid | β-hydroxyethylamine | 2-(3'-amino-4'-sulfophenylamino)-4-chloro-6-isopropoxy-1,3,5-triazine | red |
| 5 | 1-amino-8-hydroxynaphthalene-3,6-disulfonic acid | β-hydroxyethylamine | 2-(3'-amino-4'-sulfophenylamino)-4-chloro-6-(β-ethoxyethoxy)-1,3,5-triazine | " |
| 6 | 1-amino-8-hydroxynaphthalene-3,6-disulfonic acid | morpholine | 2-(3'-amino-4'-sulfophenylamino)-4-chloro-6-(β-ethoxyethoxy)-1,3,5-triazine | " |
| 7 | 1-amino-8-hydroxynaphthalene-3,6-disulfonic acid | morpholine | 2-(3'-amino-4'-sulfophenylamino)-4-chloro-6-isopropoxy-1,3,5-triazine | " |
| 8 | 1-amino-8-hydroxynaphthalene-3,6-disulfonic acid | morpholine | 2-(4'-amino-2',5'-disulfophenylamino)-4-chloro-6-isopropoxy-1,3,5-triazine | bluish red |
| 9 | 1-amino-8-hydroxynaphthalene-3,6-disulfonic acid | 1-aminobenzene-3-sulfonic acid | 2-(4'-amino-2',5'-disulfophenylamino)-4-chloro-6-isopropoxy-1,3,5-triazine | " |
| 10 | 1-amino-8-hydroxynaphthalene-3,6-disulfonic acid | 1-aminobenzene-3-sulfonic acid | 2-(3'-amino-4'-sulfophenylamino)-4-chloro-6-isopropoxy-1,3,5-triazine | red |
| 11 | 1-amino-8-hydroxynaphthalene-3,6-disulfonic acid | 1-aminobenzene-3-sulfonic acid | 2-(3'-amino-4'-sulfophenylamino)-4-chloro-6-(β-ethoxyethoxy)-1,3,5-triazine | " |
| 12 | 1-amino-8-hydroxynaphthalene-3,6-disulfonic acid | 1-amino-2-methylbenzene | 2-(4'-amino-2',5'-disulfophenylamino)-4-chloro-6-isopropoxy-1,3,5-triazine | bluish red |
| 13 | 1-amino-8-hydroxynaphthalene-3,6-disulfonic acid | 1-amino-2-methylbenzene | 2-(3'-amino-4'-sulfophenylamino)-4-chloro-6-isopropoxy-1,3,5-triazine | red |
| 14 | 1-amino-8-hydroxynaphthalene-3,6-disulfonic acid | 1-amino-2-methylbenzene | 2-(3'-amino-4'-sulfophenylamino)-4-chloro-6-(β-ethoxyethoxy)-1,3,5-triazine | " |
| 15 | 2-amino-5-hydroxynaphthalene-7-sulfonic acid | N—ethylaminobenzene | 2-(3'-amino-4'-sulfophenylamino)-4-chloro-6-(β-ethoxyethoxy)-1,3,5-triazine | orange |
| 16 | 2-amino-5-hydroxynaphthalene-7-sulfonic acid | N—ethylaminobenzene | 2-(3'-amino-4'-sulfophenylamino)-4-chloro-6-isopropoxy-1,3,5-triazine | " |
| 17 | 2-amino-5-hydroxynaphthalene-7-sulfonic acid | N—ethylaminobenzene | 2-(4'-amino-2',5'-disulfophenylamino)-4-chloro-6-isopropoxy-1,3,5-triazine | " |
| 18 | 2-amino-5-hydroxynaphthalene-7-sulfonic acid | β-hydroxyethylamine | 2-(4'-amino-2',5'-disulfophenylamino)-4-chloro-6-isopropoxy-1,3,5-triazine | " |
| 19 | 2-amino-5-hydroxynaphthalene-7-sulfonic acid | β-hydroxyethylamine | 2-(3'-amino-4'-sulfophenylamino)-4-chloro-6-isopropoxy-1,3,5-triazine | " |
| 20 | 2-amino-5-hydroxynaphthalene-7-sulfonic acid | β-hydroxyethylamine | 2-(3'-amino-4'-sulfophenylamino)-4-chloro-6-(β-ethoxyethoxy)-1,3,5-triazine | " |
| 21 | 2-amino-5-hydroxynaphthalene-7-sulfonic acid | β-sulfoethylamine | 2-(4'-amino-2',5'-disulfophenylamino)-4-chloro-6-isopropoxy-1,3,5-triazine | " |
| 22 | 2-amino-5-hydroxynaphthalene-7-sulfonic acid | β-sulfoethylamine | 2-(3'-amino-4'-sulfophenylamino)-4-chloro-6-isopropoxy-1,3,5-triazine | " |
| 23 | 2-amino-5-hydroxynaphthalene-7-sulfonic acid | β-sulfoethylamine | 2-(3'-amino-4'-sulfophenylamino)-4-chloro-6-(β-ethoxyethoxy)-1,3,5-triazine | " |
| 24 | 2-amino-5-hydroxynaphthalene-7-sulfonic acid | 1-aminobenzene-3-sulfonic amine | 2-(3'-amino-4'-sulfophenylamino)-4-chloro-6-(β-ethoxyethoxy)-1,3,5-triazine | " |
| 25 | 2-amino-5-hydroxynaphthalene-7-sulfonic acid | 1-aminobenzene-3-sulfonic acid | 2-(3'-amino-4'-sulfophenylamino)-4-chloro-6-isopropoxy-1,3,5-triazine | " |
| 26 | 2-amino-5-hydroxynaphthalene-7-sulfonic acid | 1-aminobenzene-3-sulfonic acid | 2-(4'-amino-2',5'-disulfophenylamino)-4-chloro-6-isopropoxy-1,3,5-triazine | " |
| 27 | 2-amino-5-hydroxynaphthalene-7-sulfonic acid | 1-amino-2-methylbenzene | 2-(4'-amino-2',5'-disulfophenylamino)-4-chloro-6-isopropoxy-1,3,5-triazine | " |
| 28 | 2-amino-5-hydroxynaphthalene-7-sulfonic acid | 1-amino-2-methylbenzene | 2-(3'-amino-4'-sulfophenylamino)-4-chloro-6-isopropoxy-1,3,5-triazine | " |
| 29 | 2-amino-5-hydroxynaph- | 1-amino-2-methyl- | 2-(3'amino-4'-sulfophenylamino)-4- | " |

TABLE 4-continued

| No. | Coupling component | Amino compound | Diazo component | Shade on cotton |
|---|---|---|---|---|
| | thalene-7-sulfonic acid | benzene | chloro-6-(β-ethoxyethoxy)-1,3,5-triazine | |

Following the procedures described in the preceding examples, further valuable reactive dyes are obtained by diazotising the reactive acylated diazo components listed on the left-hand side of the following Table and coupling with the reactive acylated coupling components listed on the right-hand side of the Table.

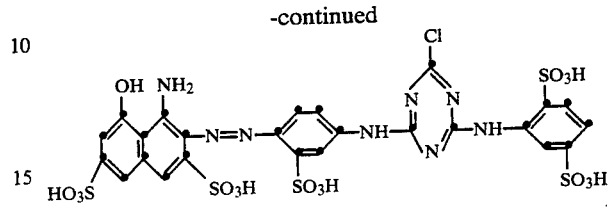

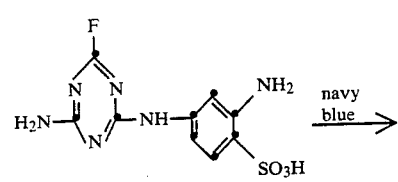 navy blue →

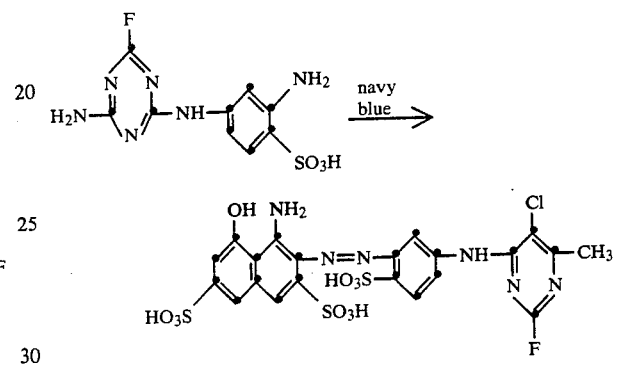

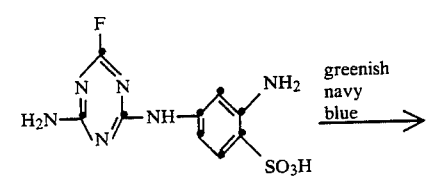 greenish navy blue →

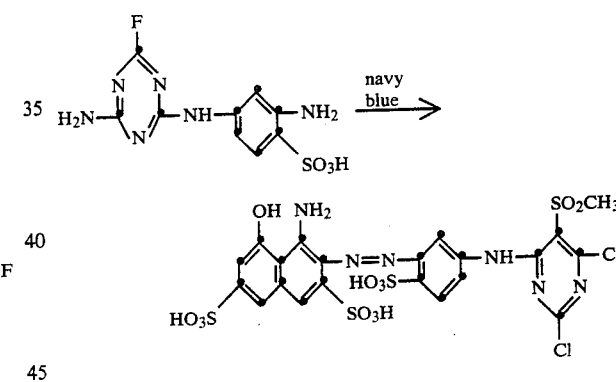

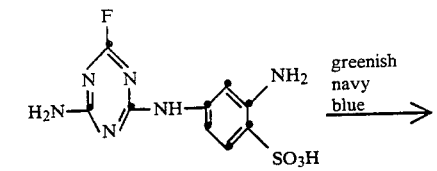 greenish navy blue →

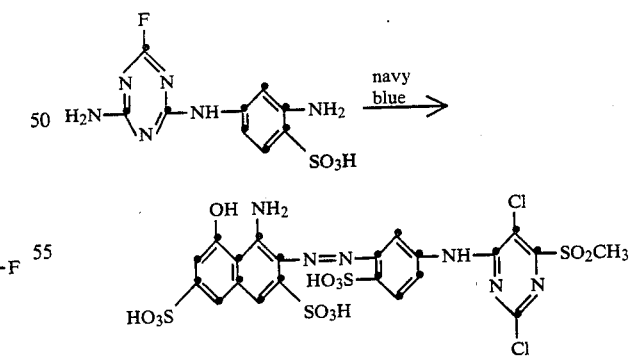

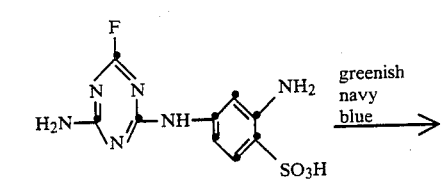 greenish navy blue →

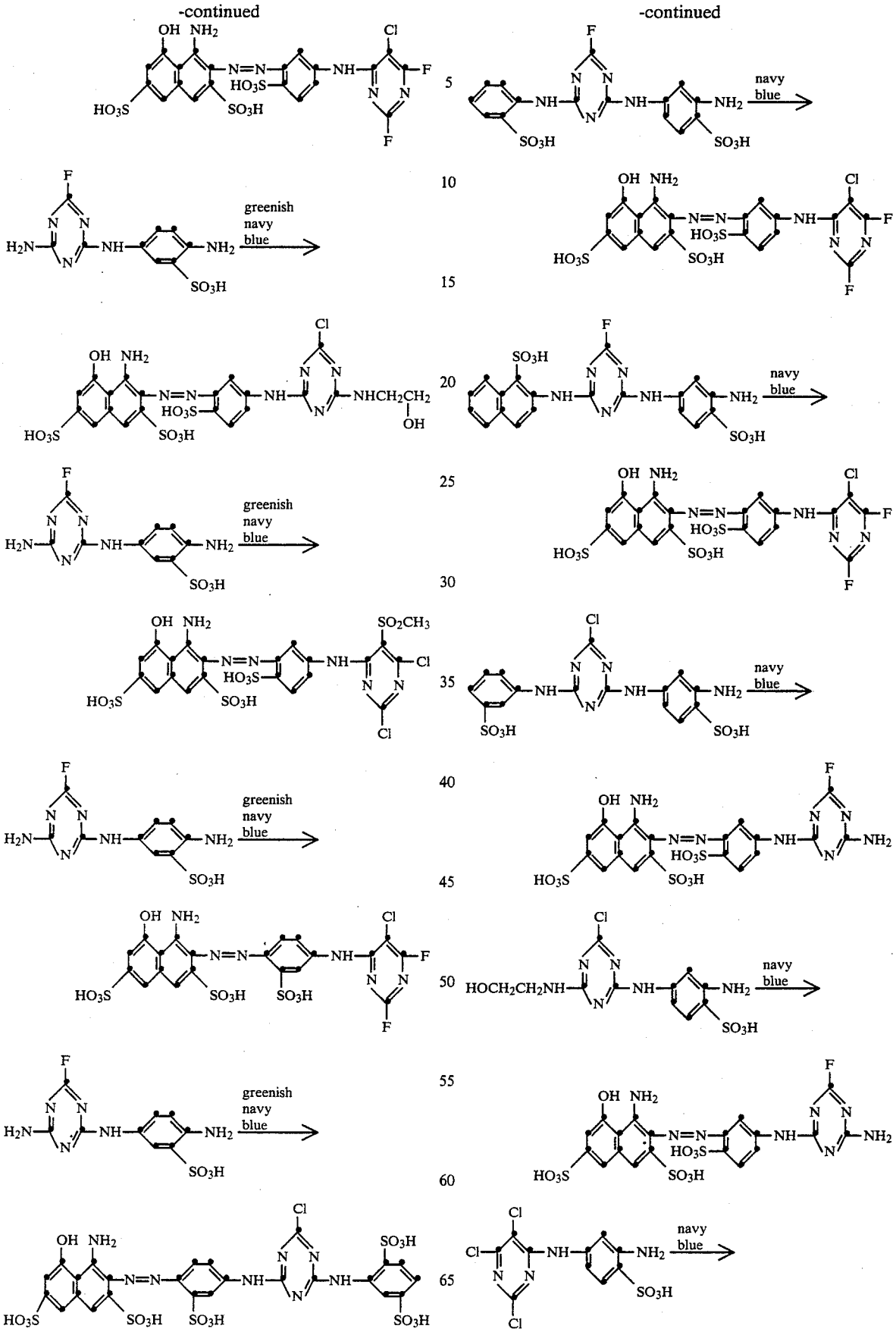

41
-continued
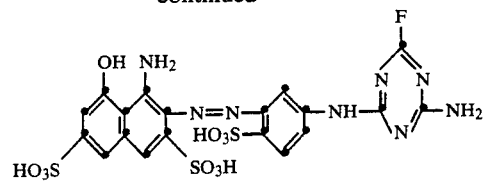
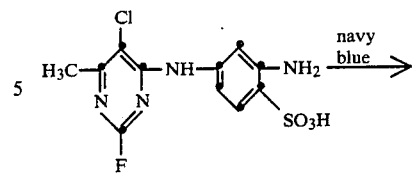 navy blue →
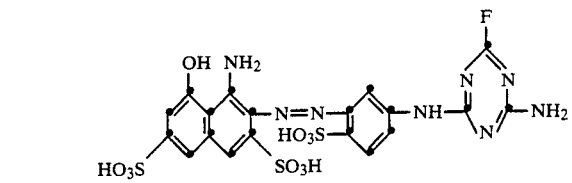
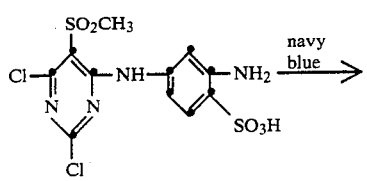 navy blue →
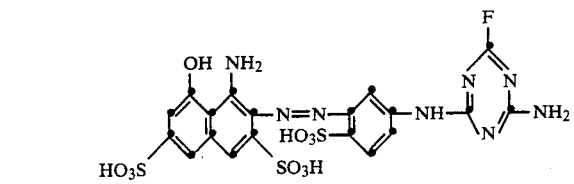
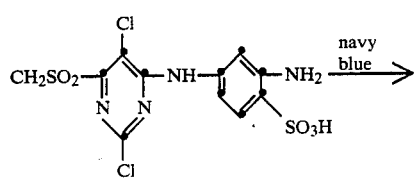 navy blue →
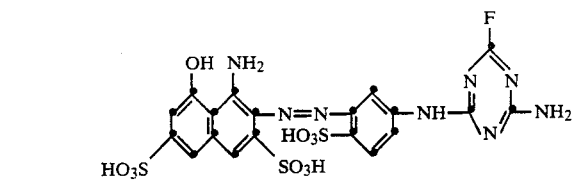
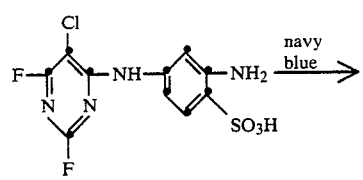 navy blue →
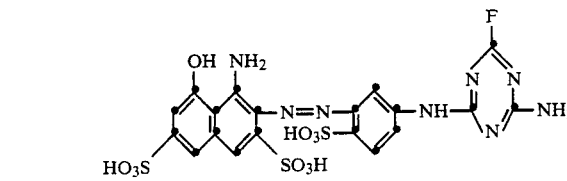
42
-continued
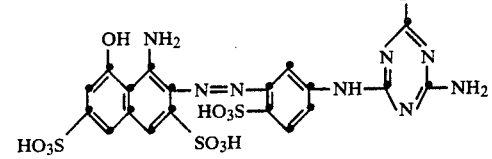 navy blue →
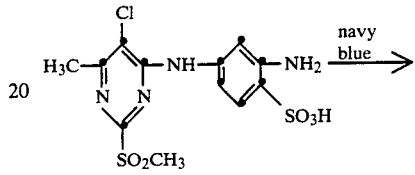
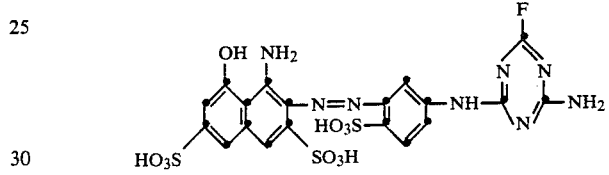 navy blue →
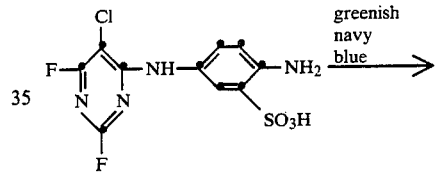
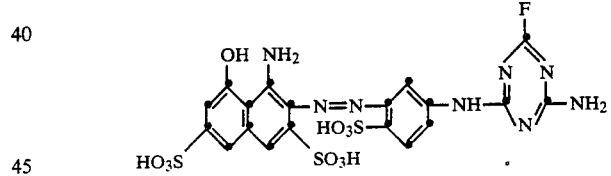 greenish navy blue →
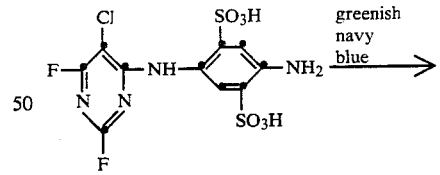
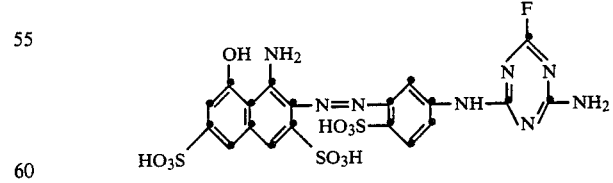 greenish navy blue →
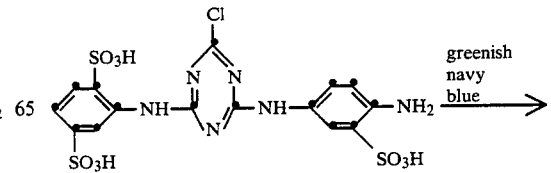 greenish navy blue →

-continued
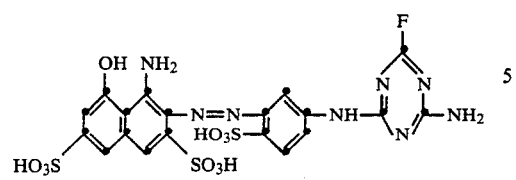
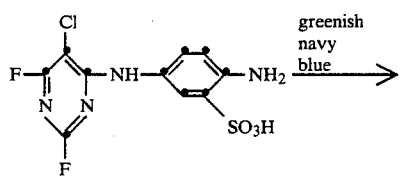 greenish navy blue →
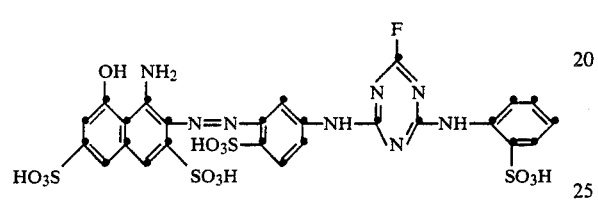
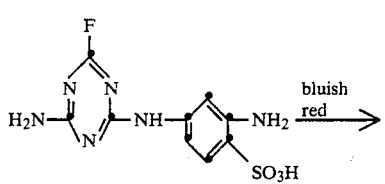 bluish red →
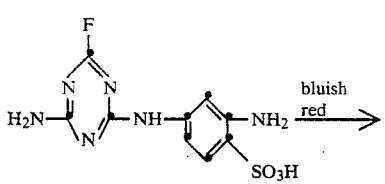
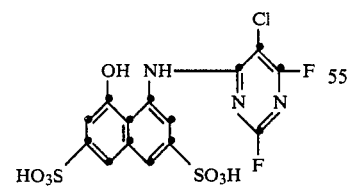 bluish red →
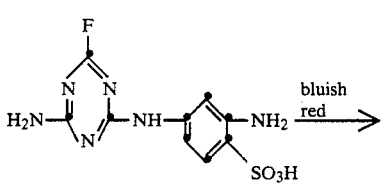 bluish red →
-continued
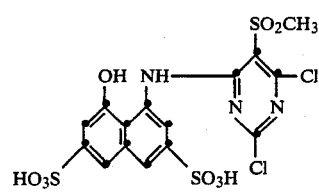
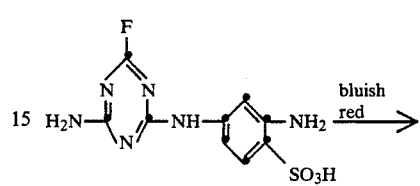 bluish red →
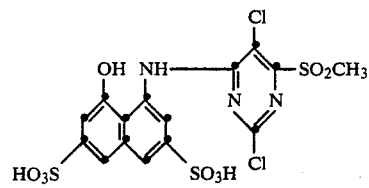
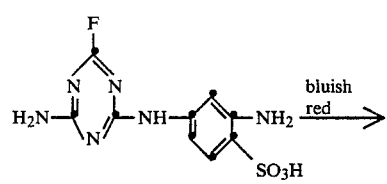 bluish red →
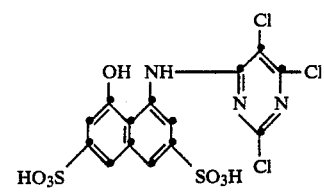
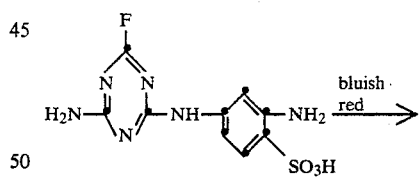 bluish red →
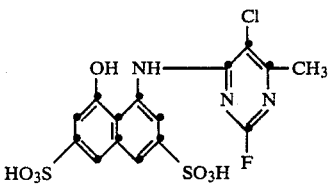
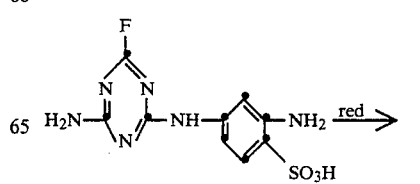 red →

-continued

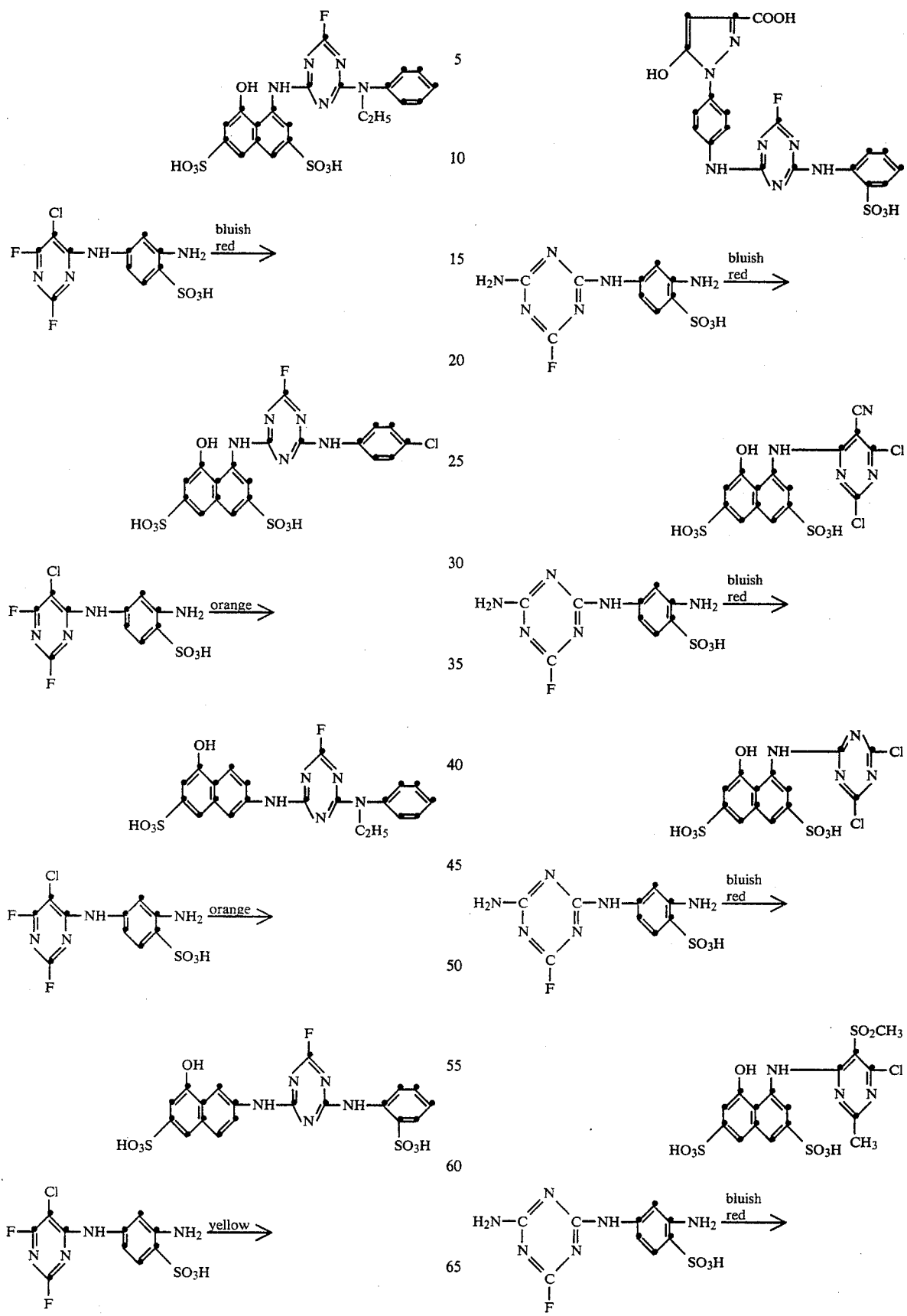

-continued

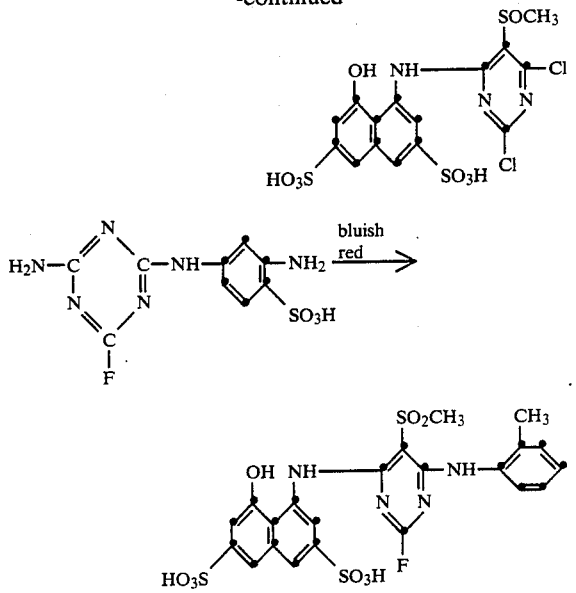

Dyeing Procedure I 2 parts of the reactive dye obtained in Example 1 are dissolved in 400 parts of water. To this solution are added 1500 parts of a solution which contains 53 g/l of sodium chloride, 100 parts of cotton fabric are put into this dyebath at 40° C. and, after 45 minutes, 100 parts of a solution containing 16 g/l of sodium hydroxide and 20 g/l of calcined sodium carbonate are added. The temperature of the dyebath is kept for another 45 minutes at 40° C. The dyed goods are then rinsed, soaped at the boil for a quarter of an hour with a non-ionic detergent, rinsed again and dried.

Dyeing Procedure II 2 parts of the reactive dye employed in Example 1 are dissolved in 400 parts of water. To this solution are added 1500 parts of a solution which contains 53 g/l of sodium chloride. 100 parts of cotton fabric are put into this dyebath at 35° C., and after 20 minutes 100 parts of a solution containing 16 g/l of sodium hydroxide and 20 g/l of calcined sodium carbonate are added. The temperature of the dyebath is kept for another 15 minutes at 35° C. Then the temperature is raised to 60° C. over 20 minutes and kept at 60° C. for another 35 minutes. The dyed goods are then rinsed, soaped at the boil for a quarter of an hour with a non-ionic detergent, rinsed again and dried.

Dyeing Procedure III 4 parts of the reactive dye employed in Example 1 are dissolved in 50 parts of water. To this solution are added 50 parts of a solution which contains 5 g/l of sodium hydroxide and 20 g/l of calcined sodium carbonate. A cotton fabric is padded with this liquor to a pick-up of 70% and then rolled up. The cotton fabric is then stored for 3 hours at room temperature. The dyed goods are then rinsed, soaped at the boil for ¼ hour with a non-ionic detergent, rinsed once more, and dried.

Dyeing Procedure IV 6 parts of the reactive dye obtained in Example 1 are dissolved in 50 parts of water. To this solution are added 50 parts of a solution which contains 16 g/l of sodium hydroxide and 0.1 liter of water glass. A cotton fabric is padded with this liquor to a pick-up of 70% and then rolled up. The cotton fabric is then stored for 10 hours at room temperature. The dyed goods are then rinsed, soaped at the boil for ¼ hour with a non-ionic detergent, rinsed one more, and dried.

Dyeing Procedure V 2 parts of the reactive dye obtained in Example 1 are dissolved in 100 parts of water by adding 0.5 part of sodium m-nitrobenzenesulfonate. A cotton fabric is impregnated with this solution to a liquor pick-up of 75% and then dried. The fabric is then impregnated with a warm solution of 20° C. which contains 4 g/l of sodium hydroxide and 300 g/l of sodium chloride, and then expressed to a pick-up of 75%. The deing is steamed for 30 seconds at 100° to 102° C., rinsed, soaped for a quarter of an hour in a 0.3% boiling solution of a non-ionic detergent, rinsed and dried.

Printing Procedure 3 parts of the reactive dye employed in Example 1 are sprinkled, with rapid stirring, into 100 parts of a stock thickening which contains 50 parts of 5% sodium alginate thickening, 27.8 parts of water, 20 parts of urea, 1 part of sodium m-nitrobenzenesulfonate and 1.2 parts of sodium hydrogen carbonate. A cotton fabric is printed with the printing paste so obtained and dried. The printed fabric is steamed for 2 minutes at 102° C. in saturated steam, then rinsed, if necessary soaped at the boil, then rinsed once more and subsequently dried.

What is claimed is:

1. A reactive dye of the formula

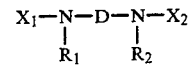

wherein D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone, or perylenetetracarbimide dye; each of R₁ and R₂ independently is hydrogen or an unsubstituted or substituted C₁-C₄-alkyl radical; X₁ is an amino-fluoro-s-triazine radical in which the amino radical is —NH₂, alkylamino, N,N-dialkylamino, cycloalkylamino, N,N-dicycloalkylamino, aralkylamino, arylamio, N-alkyl-N-cyclohexylamino, N-alkyl-N-arylamino, an amino group which contains a heterocyclic radical which may contain further fused carbocyclic rings, or an amino group in which the amino nitrogen atom is a member of an N-heterocyclic ring which may contain further hetero atoms, the alkyl, cycloalkyl, aralkyl or aryl radicals, the heterocyclic radicals or the N-heterocyclic rings being unsubstituted or further substituted by halogen, nitro, cyano, trifluoromethyl, sulfamoyl, carbamoyl, C₁-C₄-alkyl, C₁-C₄-alkoxy, acylamino, ureido, hydroxy, carboxy, sulfomethyl or sulfo; and $X_2$ is a halotriazine or halospramidine or halopyradazine radical which is attached directly to the radical D through the —$N(R_2)$— bridge member, with the proviso that $X_2$ is not an unsubstituted or substituted aminofluoro-s-triazine radical.

2. A reactive dye according to claim 1, wherein D is the radical of a monoazo or disazo dye or of a metal complex azo dye.

3. A reactive dye according to claim 2 of the formula

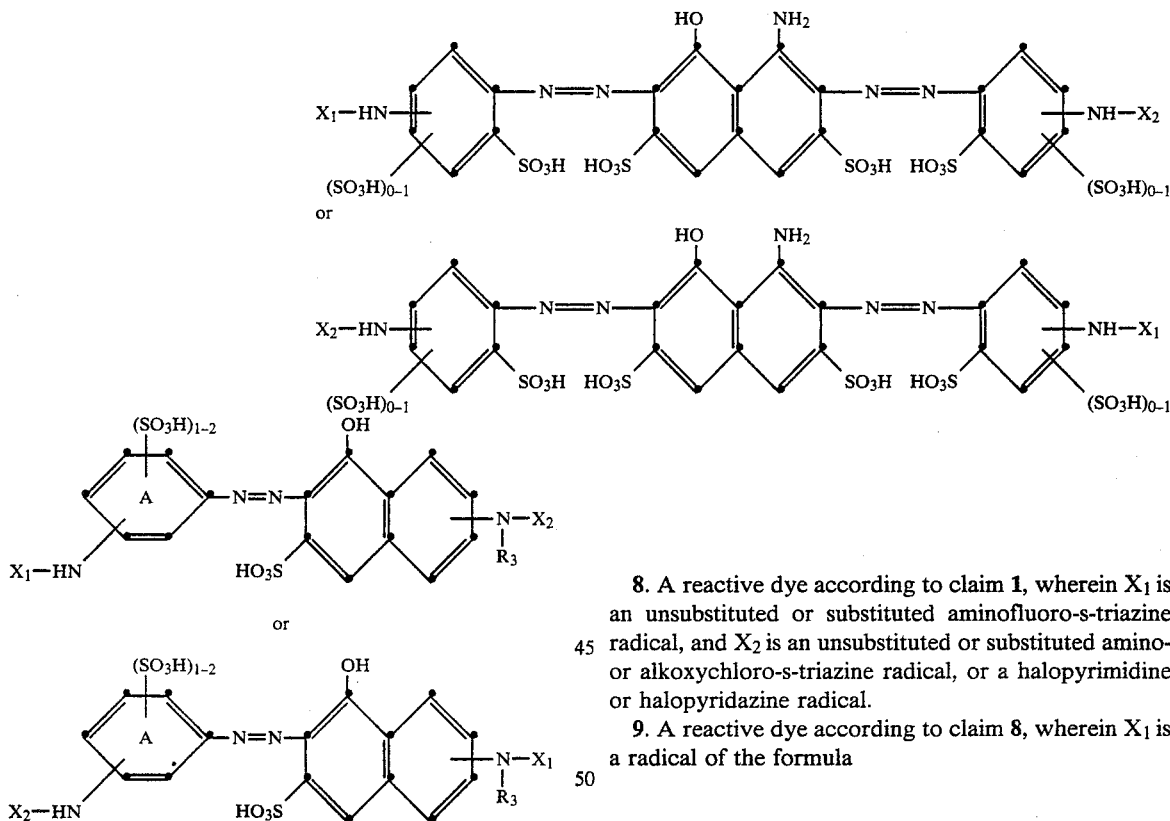

wherein $R_3$ is hydrogen, methyl or ethyl, and benzene ring A may contain further substituents.

4. A reactive dye according to claim 3, wherein the benzene ring A does not contain further substituents.

5. A reactive dye according to claim 2 of the formula

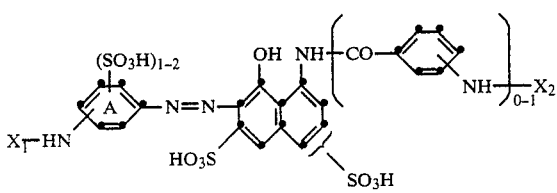

or

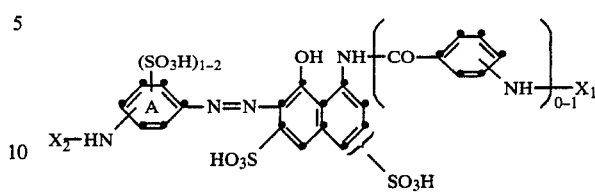

wherein benzene ring A may contain further substituents.

6. A reactive dye according to claim 5, wherein the benzene ring A does not contain further substituents.

7. A reactive dye according to claim 2 of the formula

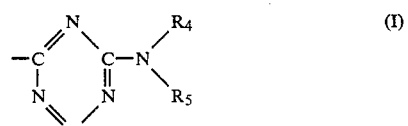

8. A reactive dye according to claim 1, wherein $X_1$ is an unsubstituted or substituted aminofluoro-s-triazine radical, and $X_2$ is an unsubstituted or substituted amino- or alkoxychloro-s-triazine radical, or a halopyrimidine or halopyridazine radical.

9. A reactive dye according to claim 8, wherein $X_1$ is a radical of the formula $$\begin{array}{c} \text{(I)} \end{array}$$

wherein each of $R_4$ and $R_5$ independently is hydrogen, $C_1$-$C_4$alkyl which is unsubstituted or substituted by halogen, cyano, $C_1$-$C_4$alkoxy, hydroxy, carboxy, sulfo or sulfato, benzyl, phenethyl, cyclohexyl, phenyl or phenyl which is substituted by halogen, nitro, cyano, trifluoromethyl, sulfamoyl, carbamoyl, $C_1$-$C_4$alkyl, $C_1$-$C_4$alkoxy, $C_1$-$C_4$alkanoylamino, benzoylamino, ureido, hydroxy, carboxy, sulfomethyl or sulfo, or naphthyl which is unsubstituted or substituted by halogen, nitro, $C_1$–$C_4$alkoxy, $C_1$–$C_4$alkanoylamino, hydroxy, carboxy or sulfo, or wherein $R_4$ and $R_5$ together with the amino nitrogen atom form a morpholino, piperidino or piperazino radical, and $X_2$ is a radical of the formula

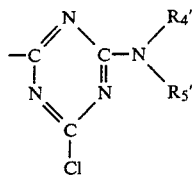 (II)

wherein $R_4'$ and $R_5'$ each independently have the same meanings as $R_4$ and $R_5$, independently thereof, or a radical of the formula

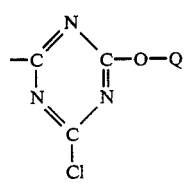 (III)

wherein Q is a $C_1$–$C_6$alkyl radical which can be substituted by halogen, hydroxy, cyano, $C_1$–$C_4$alkoxy, $C_1$–$C_4$alkoxy-$C_1$–$C_4$alkoxy, $C_1$–$C_4$alkoxycarbonyl, carboxy, sulfo, sulfato, sulfamoyl, carbamoyl, cyclohexyl or phenyl, or a radical of the formula

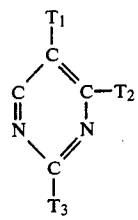 (IV)

wherein $T_1$ is hydrogen, chlorine, fluorine, cyano, nitro, methylsulfonyl or methylsulfinyl, $T_2$ is hydrogen, methyl, chlorine, fluorine, methylsulfonyl, $NH_2$ or an alkylamino, cycloalkylamino, aralkylamino or arylamino radical, and $T_3$ is hyrdrogen, chlorine, fluorine, methylsulfonyl or methyl, with the proviso that at least one of the radicals $T_1$, $T_2$ and $T_3$ is chlorine or fluorine.

10. A reactive dye according to claim 9, wherein the amino group —$NR_4R_5$ is: —$NH_2$, N-β-hydroxyethylamino, N,N-di-β-hydroxyethylamino, β-sulfoethylamino, phenylamino which may be substituted in the phenyl nucleus by chlorine, methyl, ethyl, methoxy, ethoxy, acetylamino, hydroxy, carboxy, sulfomethyl or sulfo, or is N-$C_1$–$C_4$alkyl-N-phenylamino which may be substituted in the phenyl nucleus by chlorine, methyl or ethyl, or is N-sulfo-$C_1$–$C_4$alkyl-N-phenylamino which may be substituted in the phenyl nucleus by chlorine, methyl or ethyl, or is N-hydroxy-$C_1$–$C_4$alkyl-N-phenylamino or sulfonaphthylamino, and $X_2$ is a 2,4-difluoro-5-chloropyrimid-6-yl radical.

11. A process for the preparation of a reactive dye according to claim 1, which comprises reacting a dye of the formula

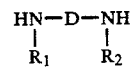

or a precursor thereof, with reactive components for introducing the radicals $X_1$ and $X_2$, or converting the intermediate so obtained into the desired final dye.

12. A process for dyeing or printing cellulosic fibre material, which comprises contacting said fibre material with a reactive dye according to claim 1.

13. A process according to claim 12, wherein the cellulosic fibre material to be dyed or printed is cotton.

* * * * *